(12) United States Patent
Kakadia et al.

(10) Patent No.: US 8,594,501 B2
(45) Date of Patent: Nov. 26, 2013

(54) DETERMINING METROPOLITAN OPTICAL TRANSPORT NETWORK ARCHITECTURES OPTIMIZED FOR LONG TERM EVOLUTION (LTE) NETWORKS

(75) Inventors: Deepak Kakadia, Union City, CA (US); Jay Lee, San Ramon, CA (US); Thomas Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 532 days.

(21) Appl. No.: 12/972,887

(22) Filed: Dec. 20, 2010

(65) Prior Publication Data

US 2012/0155859 A1 Jun. 21, 2012

(51) Int. Cl.
*H04J 14/00* (2006.01)
(52) U.S. Cl.
USPC ............. 398/66; 398/58; 398/59; 398/25; 370/254; 370/252
(58) Field of Classification Search
USPC ........ 398/43–76, 25; 370/254, 255, 256, 257, 370/258, 252
See application file for complete search history.

(56) References Cited

U.S. PATENT DOCUMENTS

| 7,796,514 | B2 * | 9/2010 | Noriega ................... 370/230 |
| 8,072,977 | B2 * | 12/2011 | Omar ...................... 370/390 |
| 2009/0161575 | A1 * | 6/2009 | Zhao et al. ............... 370/254 |
| 2012/0147782 | A1 * | 6/2012 | Puthenpura et al. ........ 370/254 |
| 2012/0163204 | A1 * | 6/2012 | Oprescu-Surcobe et al. 370/252 |

* cited by examiner

*Primary Examiner* — M. R. Sedighian

(57) ABSTRACT

A device receives Long Term Evolution (LTE) architecture information, Internet protocol (IP) network architecture information, and transport network information, and determines traffic patterns of a LTE network based on the LTE architecture information. The device also generates proposed LTE metropolitan optical transport networks (OTNs) based on the determined traffic patterns and one or more of the LTE architecture information, the IP network architecture information, and the transport network information. The device further determines transit switching for the proposed LTE metropolitan OTNs, and selects, from the proposed LTE metropolitan OTNs, a metropolitan OTN optimized for the LTE network.

25 Claims, 17 Drawing Sheets

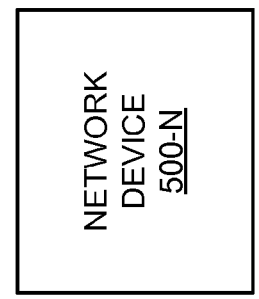
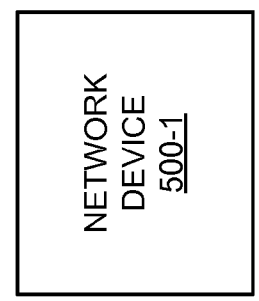
FIG. 5

DETERMINING METROPOLITAN OPTICAL TRANSPORT NETWORK ARCHITECTURES OPTIMIZED FOR LONG TERM EVOLUTION (LTE) NETWORKS

BACKGROUND

An optical transport network (OTN) includes a set of optical network elements (e.g., network devices), connected by optical fiber links, that provide transport, multiplexing, routing, management, supervision, and survivability functions for optical channels carrying optical signals. An OTN may provide transport for any digital client signal carried via any protocol that can be encapsulated in a format acceptable to the OTN. A metropolitan OTN is a geographical subset of an OTN that spans a geographical metropolitan area within an urban or suburban region, that is distinct from a core or backbone, which interconnects various metropolitan OTNs. Bandwidth requirements from end customers have increased substantially, and the resulting congestion and complexity has created a growing demand for higher bandwidth interfaces, such as interfaces provided by metropolitan OTNs. Metropolitan OTNs are inherently designed for short to medium length distances in metropolitan areas; that is, typically, within the limits of a single optical span and often less than a predetermined distance. Metropolitan OTNs are designed to provide services to a variety of customers with ranging requirements (e.g., from Digital Signal 0 (DS0) to 10 Gigabit Ethernet (10GE) services).

ITU-T G.872 defines the architecture of an OTN as including multiple layers, such as an Optical Transmission Section (OTS), an Optical Multiplex Section (OMS), and an Optical Channel (OCh). ITU-T G.709 defines the OCh layer structure and a frame format at an Optical Network Node Interface (ONNI) level. Each layer of transported information is made up of a payload and overhead. The OCh layer includes two main units (e.g., an Optical Data Unit of a particular level (k) (ODUk) and an Optical Transport Unit (OTU)), and transports payloads and associated overhead information. In particular, the purpose of the ODUk overhead is to carry information managing and monitoring an end-to-end connection crossing an OTN. The OCh layer and the ODUk layer span multiple layers, which may add to the complexity of the OTN. Furthermore, the OCh layer is an entirely optical layer, whereas the ODUk layer is not an entirely optical layer (e.g., the ODUk layer performs some electrical functions).

Fourth generation (4G) cellular networks include a radio access network (e.g., a long term evolution (LTE) network or an enhanced high rate packet data (eHRPD) network) and a wireless core network (e.g., referred to as an evolved packet core (EPC) network). The LTE network is often called an evolved universal terrestrial radio access network (E-UTRAN). The EPC network is an all-Internet protocol (IP) packet-switched core network that supports high-speed wireless and wireline broadband access technologies. An evolved packet system (EPS) is defined to include both the LTE (or eHRPD) and EPC networks.

Wireless service providers utilize circuits provided by mobile switching offices (MSOs), incumbent local exchange carriers (LECs), and other providers whose metropolitan (metro) OTNs are not optimized for LTE traffic patterns. This may result in inefficient utilization of resources, increased latencies, and increased costs. In practice, a wireless service provider's network engineering team typically constructs an overlay network to support LTE network elements. This approach force fits a new traffic pattern and new network elements onto existing OTNs that were designed for different traffic patterns. The wireless service provider incremental order circuits as capacity requirements grow, and a transport engineer monitors Layer 1 traffic and grows capacity using a localized view of individual links However, as LTE traffic increases by an order of magnitude, such incremental approaches will not scale.

BRIEF DESCRIPTION OF THE DRAWINGS

FIG. 5 is a diagram of example components of an access site or a distribution site of the network depicted in FIG. 4;

DETAILED DESCRIPTION OF PREFERRED EMBODIMENTS

The following detailed description refers to the accompanying drawings. The same reference numbers in different drawings may identify the same or similar elements.

Systems and/or methods described herein may provide a scalable, cost effective, and flexible approach to designing optimal metropolitan OTNs to support LTE networks. In one example implementation, the systems and/or methods may utilize LTE architecture information, IP network architecture information, and transport network information to carry out performance tests and cost analyses for various types of metropolitan OTNs for LTE networks. The systems and/or methods may determine a metropolitan OTN optimized for LTE networks based on the performance tests and cost analyses.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "traffic," as used herein, is intended to be broadly construed to include one or more frames, datagrams, packets, or cells; one or more fragments of a frame, one or more fragments of a datagram, one or more fragments of a packet, or one or more fragments of a cell; or another type, arrangement, or packaging of data.

Figure 1:
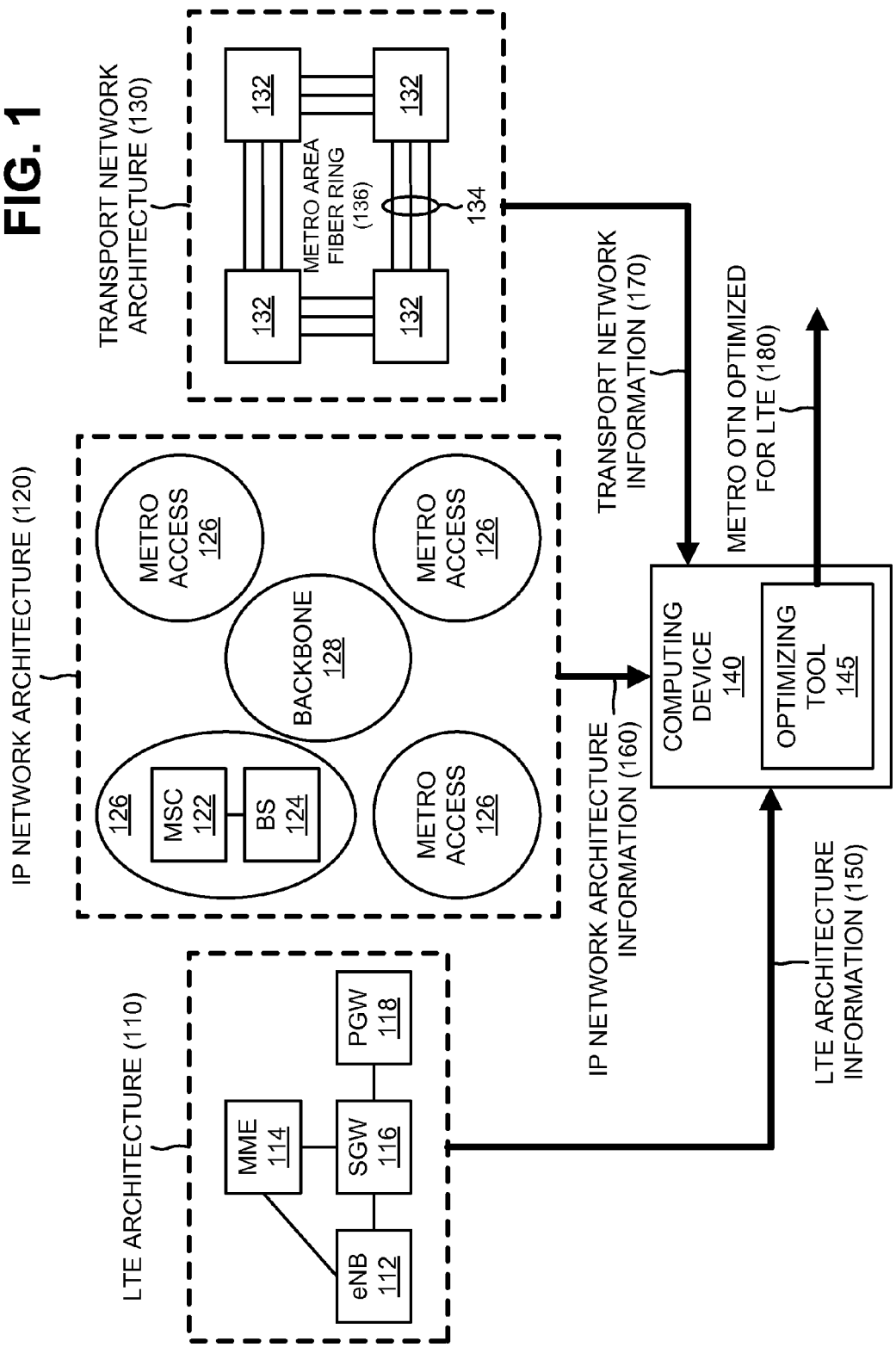
FIG. 1 is a diagram of an example network in which systems and/or methods described herein may be implemented.

FIG. 1 is a diagram of an example network 100 in which systems and/or methods described herein may be implemented. As illustrated, network 100 may include LTE architecture 110, IP network architecture 120, transport network architecture 130, and a computing device 140 (e.g., that includes an optimizing tool 145). LTE architecture 110 may include an eNodeB (eNB) 112, a mobility management entity (MME) 114, a serving gateway (SGW) 116, and a packet data network (PDN) gateway (PGW) 118. IP network architecture 120 may include a mobile switching center (MSC) 122, a base station (BS) 124, metropolitan access networks 126, and a backbone network 128. Transport network architecture 130 may include a number of locations 132 (e.g., that include MSCs) interconnected by optical fibers 134 to form a metropolitan area fiber ring 136.

Components of network 100 may interconnect via wired and/or wireless connections or links. One LTE architecture 110, one eNB 112, one MME 114, one SGW 116, one PGW 118, one IP network architecture 120, one MSC 122, one BS 124, four metropolitan access networks 126, one backbone network 128, one transport network architecture 130, four locations 132, twelve optical fibers 134, one metropolitan area fiber ring 136, one computing device 140, and one optimizing tool 145 have been illustrated in FIG. 1 for simplicity. In practice, there may be more LTE architectures 110, eNBs 112, MMEs 114, SGWs 116, PGWs 118, IP network architectures 120, MSCs 122, BSs 124, metropolitan access networks 126, backbone networks 128, transport network architectures 130, locations 132, optical fibers 134, metropolitan area fiber rings 136, computing devices 140, and/or optimizing tools 145. Also, in some instances, one or more of the components of network 100 may perform one or more functions described as being performed by another one or more of the components of network 100.

LTE architecture 110 may include a communications network that connects subscribers to a service provider. In one example, LTE architecture 110 may include a WiFi network (e.g., using IEEE 802.11 standards) or other access networks (e.g., an E-UTRAN or an enhanced high-rate packet data (eHRPD) network). In another example, LTE architecture 110 may include a radio access network capable of supporting high data rate, low latency, packet optimization, large capacity and coverage, etc. LTE architecture 110 may include functional elements, such as eNB 112, MME 114, SGW 116, and PGW 118, and may have a direct impact on IP network architecture 120 (e.g., which, in most cases, may already exist). Placement of SGW 116 and PGW 118 may control paths of bearer traffic provided from eNB 112 to SGW 116, to PGW 118, and then to a destination IP endpoint (e.g., an IP application or IP service provided by IP network architecture 120). Ideally, IP network architecture 120 may be aligned with LTE architecture 110. However, such alignment may be difficult due to the legacy infrastructure of IP architecture 120.

eNB 112 may include one or more computation and/or communication devices that receive voice and/or data from MME 114 and/or SGW 116 and wirelessly transmit that voice and/or data to user equipment (not shown). eNB 112 may also include one or more devices that wirelessly receive voice and/or data from user equipment and transmit that voice and/or data to one of MME 114 and/or SGW 116 or to other user equipment. eNB 112 may combine the functionalities of a base station and a radio network controller (RNC) in 2G or 3G radio access networks.

MME 114 may include one or more computation and/or communication devices that may be responsible for idle mode tracking and paging procedures (e.g., including retransmissions) for user equipment. MME 114 may be involved in a bearer activation and deactivation process and may choose a SGW (e.g., SGW 116) for user equipment at an initial attach and at a time of intra-LTE handover. MME 114 may authenticate user equipment. Non-access stratum (NAS) signaling may terminate at MME 114 and MME 114 may generate and allocate temporary identities to user equipment. MME 114 may check authorization of user equipment to camp on a service provider's Public Land Mobile Network (PLMN) and may enforce roaming restrictions for user equipment. MME 114 may provide a control plane function for mobility between LTE and access networks.

SGW 116 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 116 may route and forward traffic, may act as a mobility anchor for a user plane during inter-eNB handovers, and may act as an anchor for mobility between LTE and other 3GPP technologies. For idle state user equipment, SGW 116 may terminate a downlink (DL) data path and may trigger paging when DL data arrives for user equipment. SGW 116 may manage and store contexts associated with user equipment (e.g., parameters of an IP bearer service, network internal routing information, etc.).

PGW 118 may include one or more traffic transfer devices (or network devices), such as a gateway, a router, a switch, a firewall, a NIC, a hub, a bridge, a proxy server, an OADM, or some other type of device that processes and/or transfers data. In one example implementation, PGW 118 may provide connectivity of user equipment to external packet data networks (PDNs) (e.g., to IP network architecture 120) by being a traffic exit/entry point for user equipment. PGW 118 may perform policy enforcement, packet filtering for each user, charging support, lawful intercept, and packet screening. PGW 118 may also act as an anchor for mobility between 3GPP and non-3GPP technologies.

IP network architecture 120 may include one or more Layer 3 networks (e.g., a local area network (LAN), a wide area network (WAN), a metropolitan area network (MAN), a telephone network, the Internet, etc.) capable of communicating with user equipment. IP network architecture 120 may support either Global System for Mobile Communications (GSM)-based or code division multiple access (CDMA)-based carriers. Base station 124 may create a cell site in IP network architecture 120. The cell site may originate client IP source traffic, which may aggregate to a particular MSC 122.

MSC 122 may connect to other geographically nearby MSCs to form metropolitan access network 126. A large area (e.g., a country) may be divided into several metropolitan access networks 126 that aggregate traffic to backbone network 128.

MSC 122 may include one or more traffic transfer devices (or network devices), such as a gateway, a router, a switch, a firewall, a NIC, a hub, a bridge, a proxy server, an OADM, or some other type of device that processes and/or transfers data. In one example, MSC 122 may aggregate traffic from base station 124 (and other base stations, not shown), and may connect to other MSCs to form metropolitan access network 126.

Base station 124 may include one or more computation and/or communication devices that receive traffic from MSC 122 and wirelessly transmit that traffic to user equipment (not shown). Base station 124 may also include one or more devices that wirelessly receive traffic from user equipment and transmit that traffic to MSC 122 or to other user equipment.

Metropolitan access network 126 may include an access network (e.g., sized between the size of a LAN or a WAN) formed by the aggregation of MSCs 122 and associated base stations 124.

Backbone network 128 may include a network that aggregates traffic from metropolitan area networks 126. Backbone network 128 may include one or more devices that transfer/receive traffic to a circuit-switched and/or packet-switched network. In one implementation, backbone network 128 may include, for example, one or more MSCs, one or more Gateway MSCs (GMSCs), one or more Media Gateways (MGWs), one or more Serving General Packet Radio Services (GPRS) Support Nodes (SGSNs), one or more Gateway GPRS Support Nodes (GGSNs), and/or other devices.

Transport network architecture 130 may include one or more Layer 1 transport rings, OTNs, or metropolitan OTNs that provide transport, multiplexing, routing, management, supervision, and survivability functions for optical channels carrying optical signals. For example, as shown in FIG. 1, transport network architecture 130 may include multiple geographical locations 132 (e.g., that include one or more MSCs), interconnected by optical fibers 134, to form a metropolitan area fiber ring 136 (or a metropolitan OTN). Transport network architecture 130 may include multiple optical fibers with multiple fiber rings that overlap. These fiber networks may have been built up over years based on incremental tactical requirements and planning, and may create disconnects with LTE architecture 110.

Computing device 140 may include one or more computation or communication devices, that gather, process, and/or provide information in a manner described herein. In one example, computing device 140 may include a server device, a laptop computer, a personal computer, a workstation computer, etc. As shown in FIG. 1, computing device 140 may receive LTE architecture information 150 from LTE architecture 110, IP network architecture information 160 from IP network architecture 120, and transport network information 170 from transport network architecture 130. Information 150 may include, for example, information about devices associated with LTE architecture 110 (e.g., eNB 112, MME 114, SGW 116, PGW 118, etc.); information about the locations of the devices; information about the interconnectivity of the devices; etc. Information 160 may include, for example, information about devices associated with IP network architecture 120 (e.g., MSC 122, base station 124, etc.); information about the locations of the devices; information about the interconnectivity of the devices; etc. Information 170 may include, for example, information about devices associated with transport network architecture 130 (e.g., MSCs, network devices, etc.); information about the locations of the devices; information about the interconnectivity of the devices; etc. Computing device 140 may provide information 150-170 to optimizing tool 145.

Optimizing tool 145 may include software that, when executed by hardware components of computing device 140, enables computing device 140 to utilize information 150-170 to generate a metropolitan OTN optimized for LTE, as indicated by reference number 180. Optimal LTE metro OTN 180 may include information about devices to be provided in optimal LTE metro OTN 180; information about the physical locations of the devices in relation to IP network devices and/or LTE network devices; information about the interconnectivity of the devices; etc.

In one example implementation, computing device 140 (e.g., via optimizing tool 145) may determine that certain LTE architecture 110 devices (e.g., SGW 116 and PGW 118) may be located near devices of IP network architecture 120 and/or transport network architecture 130. For example, computing device 140 (e.g., via optimizing tool 145) may determine that MME 114, SGW 116, and/or PGW 118 may be located near MSC 122, may be located in metropolitan access network 126, may be located in backbone network 128, or may be provided between networks 126 and 128. Computing device 140 (e.g., via optimizing tool 145) may also determine that a key to designing optimal LTE metro OTN 180 may include a correlation of a hub of optimal LTE metro OTN 180 to the location of SGW 116 and PGW 118. eNB 112 traffic may enter optimal LTE metro OTN 180 via an access site (e.g., which may include a MSC). The traffic from the access site may home to SGW 116, which may be located at a distribution site or an access site (e.g., depending which is a hub) of optimal LTE metro OTN 180. Thus, computing device 140 (e.g., via optimizing tool 145) may determine that the hub of optimal LTE metro OTN 180 should coincide with the physical locations of SGW 116 and PGW 118.

In another example implementation, computing device 140 (e.g., via optimizing tool 145) may receive information 150-170, and may determine traffic patterns of LTE architecture 110 based on LTE architecture information 150. Computing device 140 (e.g., via optimizing tool 145) may determine an optimal OTN configuration based on transport network information 170 and the LTE traffic patterns, and may generate a number of proposed LTE metro OTNs based on IP network information 160, the LTE traffic patterns, and the optimal OTN configuration. Computing device 140 (e.g., via optimizing tool 145) may determine transit switching for the number of proposed LTE metro OTNs, and may conduct performance tests and a cost analysis on the number of proposed LTE metro OTNs. Computing device 140 (e.g., via optimizing tool 145) may select optimal LTE metro OTN 180, from the number of proposed LTE metro OTNs, based on the performance tests and the cost analysis.

Although FIG. 1 shows example components of network 100, in other implementations, network 100 may contain fewer components, different components, differently arranged components, or additional components than depicted in FIG. 1.

Figure 2:
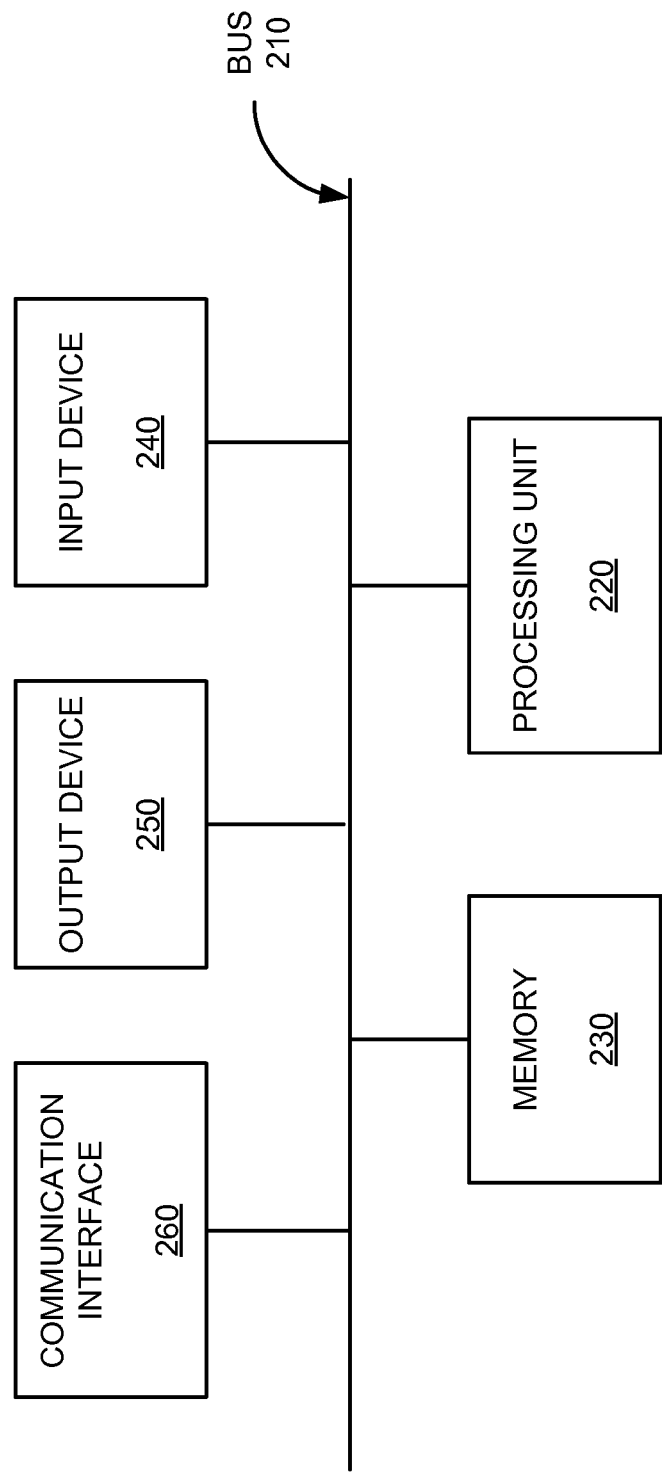
FIG. 2 is a diagram of example components of one or more devices of the network depicted in FIG. 1.

FIG. 2 is a diagram of example components of a device 200 that may correspond to one of the devices (e.g., computing device 140) of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
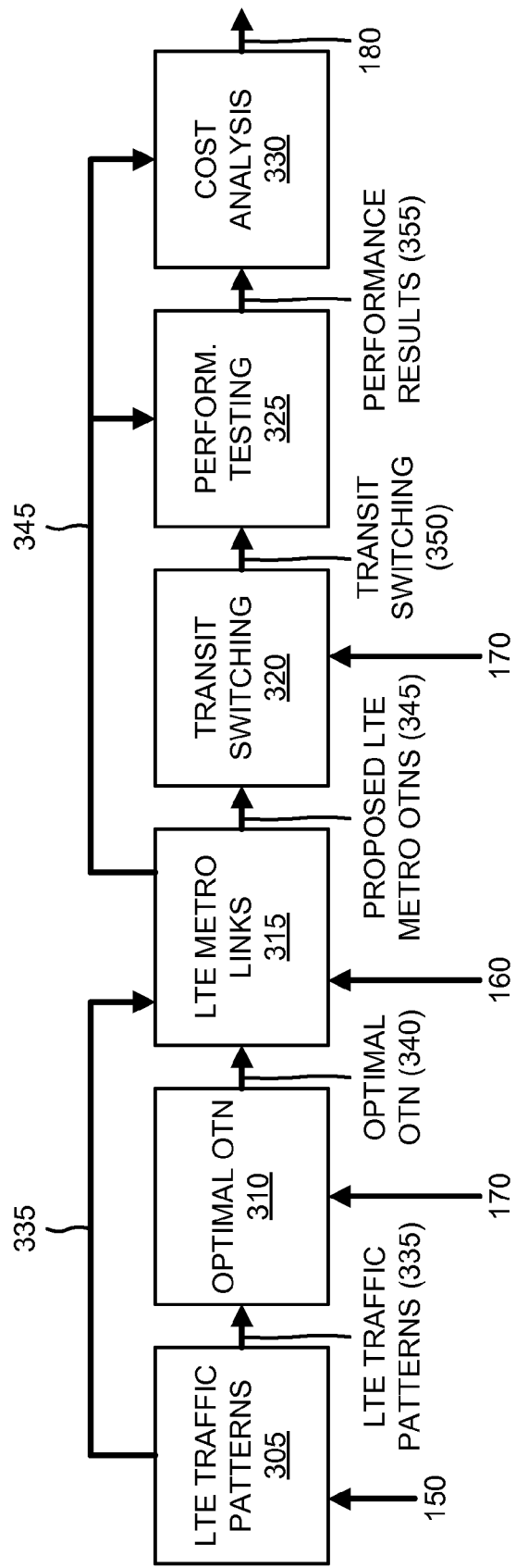
FIG. 3 is a diagram of example functional components of an optimizing tool of a computing device shown in FIG. 1.

FIG. 3 is a diagram of example functional components of optimizing tool 145. As illustrated, optimizing tool 145 may include a LTE traffic patterns component 305, an optimal OTN component 310, a LTE metro links component 315, a transit switching component 320, a performance testing component 325, and a cost analysis component 330. In one example implementation, the functions described in connection with FIG. 3 may be performed by one or more of the example components of device 200 (FIG. 2).

LTE traffic patterns component 305 may include hardware or a combination of hardware and software that may receive LTE architecture information 150, and may determine traffic patterns 335 of LTE architecture 110 based on LTE architecture information 150. In one example implementation, LTE traffic patterns 335 may include voice traffic at a particular bandwidth (e.g., "5" gigabits per second (Gbps)) and data traffic at a particular bandwidth (e.g., "20" Gbps). As further shown in FIG. 3, LTE traffic patterns component 305 may provide LTE traffic patterns 335 to optimal OTN component 310 and LTE metro links component 315.

Optimal OTN component 310 may include hardware or a combination of hardware and software that may receive LTE traffic patterns 335 from LTE traffic patterns component 305, and may receive transport network information 170. Optimal OTN component 310 may determine an optimal OTN configuration 340 based on LTE traffic patterns 335 and/or transport network information 170. Optimal OTN component 310 may provide optimal OTN configuration 340 to LTE metro links component 315. In one example implementation, optimal OTN component 310 may determine optimal OTN configuration 340 as set forth below in connection with, for example, FIGS. 4-7.

Figure 4:
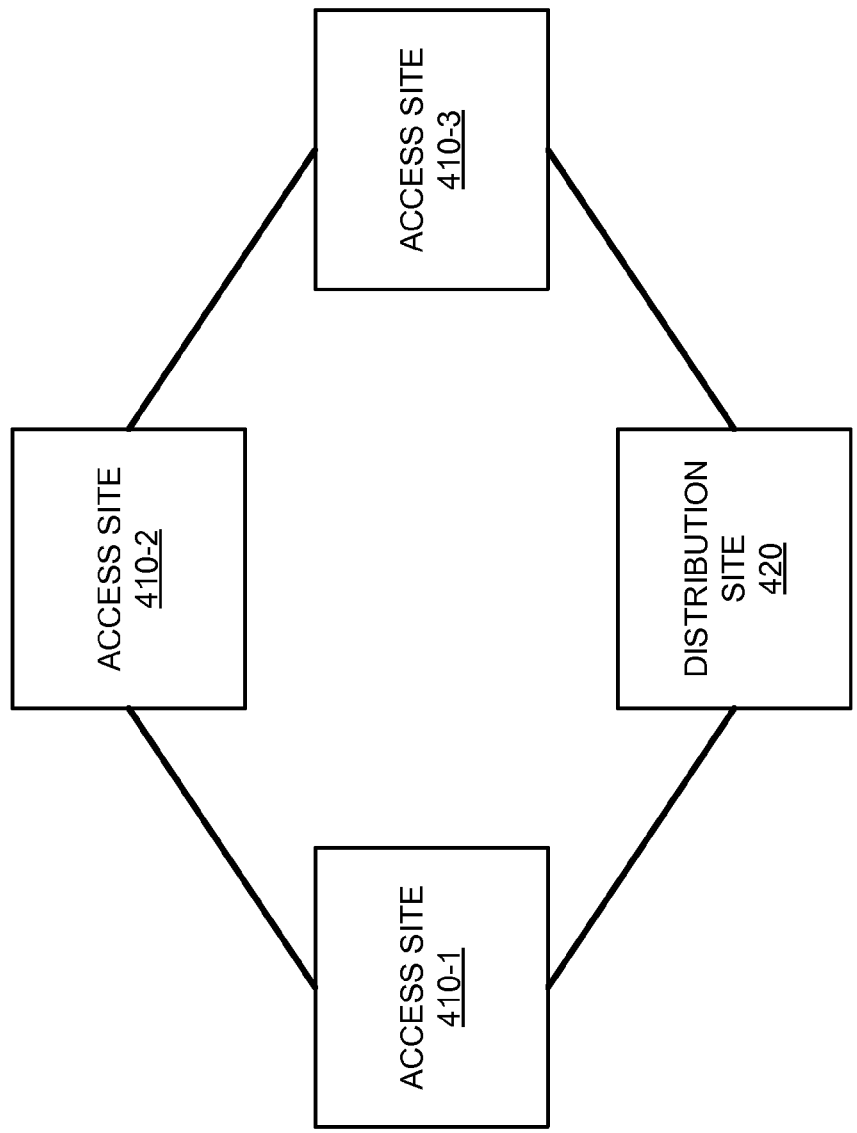
FIG. 4 is a diagram of an example network capable being generated by an optimal OTN component depicted in FIG. 3.

FIG. 4 is a diagram of an example network 400 capable being generated by optimal OTN component 310 (FIG. 3). As illustrated, network 400 may include three access sites 410-1, 410-2, and 410-3 (collectively referred to herein as "access sites 410," or, in some instances, singularly as "access site 410") and a distribution site 420 interconnected by optical connections (e.g., optical fibers or some other optical communication media). Three access sites 410 and one distribution site 420 have been illustrated in FIG. 4 for simplicity. In practice, there may be more access sites 410 and/or distribution sites 420. Also, in some instances, one or more of the components of network 400 may perform one or more functions described as being performed by another one or more of the components of network 400. In one example implementation, network 400 may correspond to transport network architecture 130 (FIG. 1), an OTN, or a metropolitan OTN that provides transport, multiplexing, routing, management, supervision, and survivability functions for optical channels carrying optical signals. In one example, access sites 410 and/or distribution sites 420 may correspond to locations 132 of transport network architecture 130 (FIG. 1).

Access site 410 may include one or more network devices, or other types of computation or communication devices, that gather, process, search, and/or provide information in a manner described herein. For example, access site 410 may include one or more network devices that enable customers (e.g., via computation or communication devices) to access network 400 so that network 400 may provide a variety of services (e.g., from DS0 to 10GE services) to the customers. In one example implementation, access site 410 may include one or more reconfigurable optical add-drop multiplexers (ROADMs) that optically communicate (e.g., traffic) with customer devices (e.g., computation or communication devices), other access sites 410, and/or distribution site 420.

Distribution site 420 may include one or more network devices, or other types of computation or communication devices, that gather, process, search, and/or provide information in a manner described herein. For example, distribution site 420 may include one or more network devices that enable traffic (e.g., customer traffic) to be communicated to or from one or more access sites 410. In one example implementation, distribution site 420 may include one or more ROADMs that optically communicate (e.g., transfer traffic) with one or more access sites 410. Distribution site 420 may aggregate traffic from a particular area (e.g., areas encompassed by access sites 410), may aggregate traffic from access sites 410, and may communicate with an IP backbone.

Although FIG. 4 shows example components of network 400, in other implementations, network 400 may contain fewer components, different components, differently arranged components, or additional components than depicted in FIG. 4.

FIG. 5 is a diagram of example components of access site 410 or distribution site 420. As illustrated, access site 410/distribution site 420 may include one or more network devices 500-1, . . . , 500-N (collectively referred to as "network devices 500," or, in some instances, singularly as "network device 500").

Network device 500 may include a traffic transfer device, such as a gateway, a router, a switch, a firewall, a NIC, a hub, a bridge, a proxy server, an OADM, or some other type of device that processes and/or transfers traffic. In one example, network device 500 may include a device that is capable of transmitting information to and/or receiving information from other access sites 410 and/or distribution site 420. In one example implementation, network device 500 may include a ROADM that optically communicates (e.g., traffic) with customer devices (e.g., computation or communication devices), other network devices 500, other access sites 410, and/or distribution site 420.

Although FIG. 5 shows example components of access site 410/distribution site 420, in other implementations, access site 410/distribution site 420 may contain fewer components, different components, differently arranged components, or additional components than depicted in FIG. 5. Alternatively, or additionally, one or more components of access site 410/distribution site 420 may perform one or more other tasks described as being performed by one or more other components of access site 410/distribution site 420.

Figure 6:
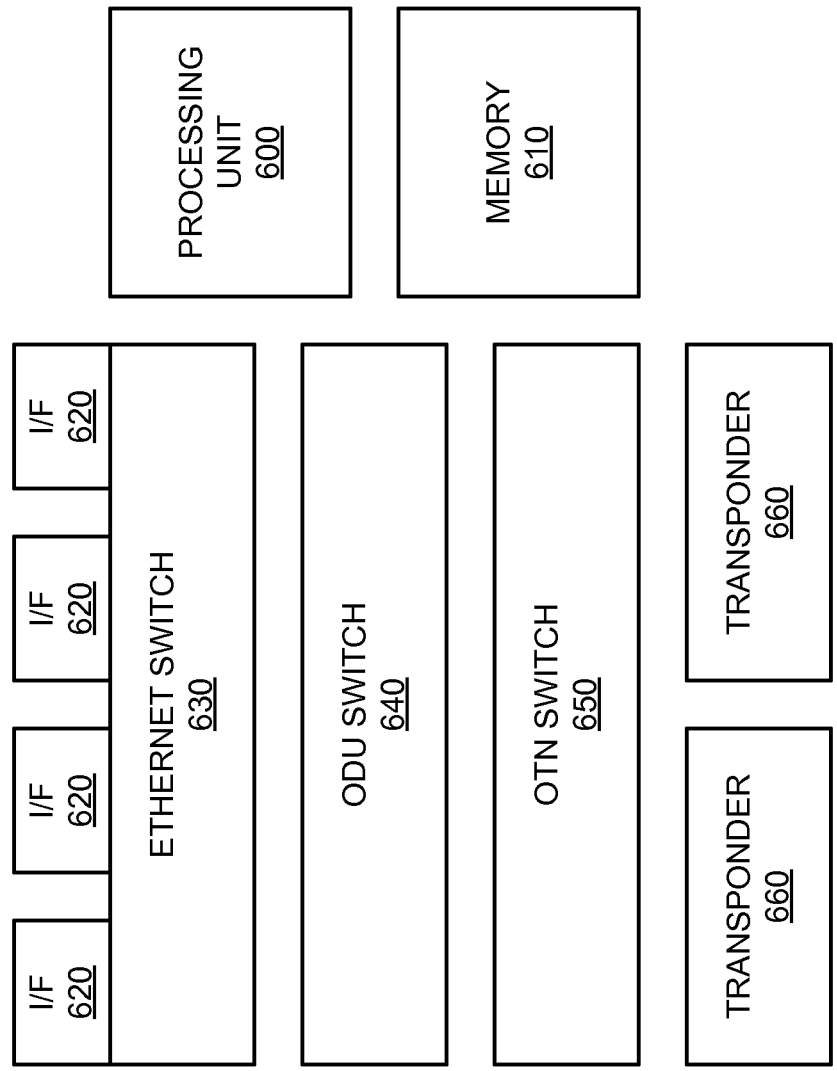
FIG. 6 is a diagram of example components of a network device illustrated in FIG. 5.

FIG. 6 is a diagram of example components of network device 500, when network device 500 corresponds to a ROADM. A ROADM may include a form of an OADM that adds the ability to remotely switch traffic from a wavelength-division multiplexing (WDM) system at a wavelength layer. The ROADM may achieve this through use of a wavelength-selective switching module. The wavelength-selective switching module may permit individual or multiple wavelengths carrying data channels to be added and/or dropped from a transport fiber without the need to convert signals on all of the WDM channels to electronic signals and back again to optical signals.

As illustrated in FIG. 6, network device 500 may include a processing unit 600, a memory 610, multiple interfaces (I/F) 620, an Ethernet switch 630, an optical data unit (ODU) switch 640, an optical transport network (OTN) switch 650, and multiple transponders 660. Components of network device 500 may interconnect via wired or wireless connections.

Processing unit 600 may include one or more processors or microprocessors that interpret and execute instructions. In other implementations, processing unit 600 may be implemented as or include one or more ASICs, FPGAs, or the like.

Memory 610 may include a RAM or another type of dynamic storage device that stores information and instructions for execution by processing unit 600, a ROM or another type of static storage device that stores static information and instructions for the processing unit 600, and/or some other type of magnetic or optical recording medium and its corresponding drive for storing information and/or instructions.

Interface 620 may be a point of attachment for physical links (e.g., optical fibers) and may be a point of entry for incoming traffic or a point of exit for outgoing traffic (e.g., to customer computation or communication devices). For example, interface 620 may send (e.g., may be an exit point) and/or receive (e.g., may be an entry point) traffic. In one example implementation, each of interfaces 620 may correspond to a 10 gigabit Ethernet (10GE) interface.

Ethernet switch 630 may include a component that interconnects network device 500 in an Ethernet network. In one example, Ethernet switch 630 may be an unmanaged component with no configuration capability. In another example, Ethernet switch 630 may be a managed component that may be configured into virtual local area networks (VLANs). Port bandwidths may be adjusted in a managed Ethernet switch, and a spanning tree protocol may be enabled in a managed Ethernet switch. In other implementations, Ethernet switch 630 may be replaced with other types of optical switches, such as a Synchronous Optical Networking (SONET) switch, a Synchronous Digital Hierarchy (SDH) switch, etc.

ODU switch 640 may include a component that enables optical signals to be selectively switched between Ethernet switch 630 and transponders 660. ODU switch 640 may provide switching functions, such as a Time Slot Interchange (TSI) function of SONET.

OTN switch 650 may include a component that enables optical signals to be selectively switched between Ethernet switch 630 and transponders 660. OTN switch 650 may provide switching functions, such as a TSI function of SONET.

Transponder 660 may include a component that receives an optical signal, processes the optical signal, and re-transmits the optical signal at a particular frequency and wavelength. Transponders 660 may communicate with other components of network device 500, other network devices 500, other access sites 410, and/or distribution site 420.

As described herein, network device 500 may perform certain operations in response to processing unit 600 executing software instructions contained in a computer-readable medium, such as memory 610. The software instructions may be read into memory 610 from another computer-readable medium or from another device via a communication interface (e.g., interface 620). The software instructions contained in memory 610 may cause processing unit 600 to perform processes described herein. Alternatively, hardwired circuitry may be used in place of or in combination with software instructions to implement processes described herein. Thus, implementations described herein are not limited to any specific combination of hardware circuitry and software.

Although FIG. 6 shows example components of network device 500, in other implementations, network device 500 may contain fewer components, different components, differently arranged components, or additional components than depicted in FIG. 6. Alternatively, or additionally, one or more components of network device 500 may perform one or more other tasks described as being performed by one or more other components of network device 500.

Figure 7:
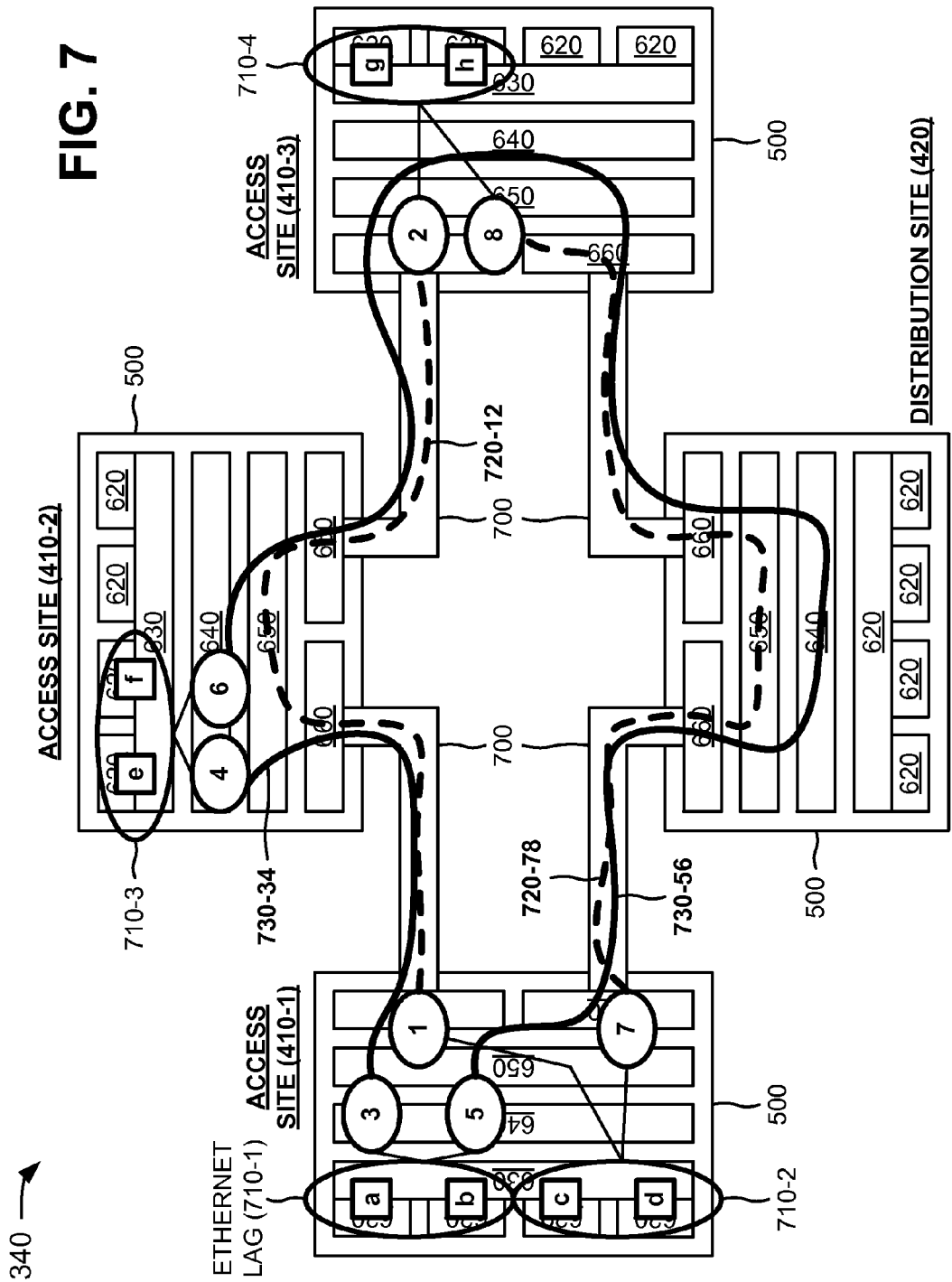
FIG. 7 is a diagram of an example optimal OTN configuration capable being generated by the optimal OTN component depicted in FIG. 3.

FIG. 7 is a diagram of an example optimal OTN configuration 340 capable being generated by optimal OTN component 310 (FIG. 3). As shown, example optimal OTN configuration 340 may include access sites 410-1, 410-2, and 410-3, distribution site 420, and network devices 500. Access sites 410-1, 410-2, and 410-3, distribution site 420, and network devices 500 may include the features described above in connection with, for example, one or more of FIGS. 4-6. Network devices 500 (e.g., via transponders 660) of access sites 410 and distribution site 420 may physically interconnect via optical communication media 700 (e.g., optical fibers).

As further shown in FIG. 7, network device 500 of access site 410-1 may establish a first Ethernet link aggregation group (LAG) 710-1 with two interfaces 620 (e.g., marked as "a" and "b") associated with Ethernet switch 630. A link aggregation (e.g., as set forth in IEEE 802.3ad) is a computer networking term which describes using multiple links (e.g., Ethernet network cables and/or ports in parallel) as one logical port to increase the link speed beyond the limits of any one single link. Other terms used for link aggregation may include Ethernet trunking, port teaming, NIC bonding, link bundling, and/or a link aggregation group (LAG). A LAG will be used hereinafter to refer to link aggregation.

Network device 500 of access site 410-1 may establish a second Ethernet LAG 710-2 with two different interfaces 620 (e.g., marked as "c" and "d") associated with Ethernet switch 630. Network device 500 of access site 410-2 may establish an Ethernet LAG 710-3 with two interfaces 620 (e.g., marked as "e" and "f") associated with Ethernet switch 630. Network device 500 of access site 410-3 may establish an Ethernet LAG 710-4 with two interfaces 620 (e.g., marked as "g" and "h") associated with Ethernet switch 630. Each of Ethernet LAGs 710-1 through 710-4 may include a Layer 2 transport abstraction that may aggregate any Ethernet interface (e.g., interfaces 620) to create one logical combined Ethernet point-to-point connection.

As further shown in FIG. 7, multiple LAGs may be created at various OTN layers. For example, an optical channel (OCh) LAG, which includes two OCh LAG subpaths, may be created between network device 500 of access site 410-1 and network device 500 of access site 410-3. The OCh LAG may include an OCh transport abstraction that may aggregate any OCh path to create one logical OCh point-to-point connection. A first OCh LAG subpath 720-12 of the OCh LAG may begin at network device 500 of access site 410-1 (e.g., at a point marked "1" associated with OTN switch 650); may traverse network device 500 of access site 410-2, via optical bypass (e.g., network device 500 of access site 410-2 may not process wavelengths of optical signals); and may terminate at network device 500 of access site 410-3 (e.g., at a point marked "2" associated with OTN switch 650). First OCh LAG subpath 720-12 may map Ethernet LAG 710-1 (e.g., marked as "a" and "b") to Ethernet LAG 710-4 (e.g., marked as "g" and "h"). A second OCh LAG subpath 720-78 of the OCh LAG may begin at network device 500 of access site 410-1 (e.g., at a point marked "7" associated with OTN switch 650); may traverse network device 500 of distribution site 420, via optical bypass (e.g., network device 500 of distribution site 420 may not process wavelengths of optical signals); and may terminate at network device 500 of access site 410-3 (e.g., at a point marked "8" associated with OTN switch 650). Second OCh LAG subpath 720-78 may map Ethernet LAG 710-1 (e.g., marked as "a" and "b") to Ethernet LAG 710-4 (e.g., marked as "g" and "h").

When information (e.g., optical signals, such as an ODUk container) is provided to the OCh LAG (e.g., via Ethernet LAG 710-1), network device 500 of access site 410-1 may determine (e.g., based on a hash value, a round robin, or some other technique) whether to forward the information (e.g., a payload of the information) to network device 500 of access site 410-3 via first OCh LAG subpath 720-12 or second OCh LAG subpath 720-78. Once network device 500 of access site 410-1 determines the OCh LAG subpath, network device 500 of access site 410-1 may forward the information to network device 500 of access site 410-3 via the determined OCh LAG subpath. Accordingly, the information may be passed from Ethernet LAG 710-1 to Ethernet LAG 710-4.

As further shown in FIG. 7, an optical data unit (ODUk) LAG, which includes two ODUk LAG subpaths, may be created between network device 500 of access site 410-1 and network device 500 of access site 410-2. The ODUk LAG may include an ODUk transport abstraction that may aggregate any ODUk path to create one logical ODUk point-to-point connection. A first ODUk LAG subpath 730-34 of the ODUk LAG may begin at network device 500 of access site 410-1 (e.g., at a point marked "3" associated with ODU switch 640), and may terminate at network device 500 of access site 410-2 (e.g., at a point marked "4" associated with ODU switch 640). First ODUk LAG subpath 730-34 may map Ethernet LAG 710-1 (e.g., marked as "a" and "b") to Ethernet LAG 710-3 (e.g., marked as "e" and "f"). A second ODUk LAG subpath 730-56 of the ODUk LAG may begin at network device 500 of access site 410-1 (e.g., at a point marked "5" associated with ODU switch 640); may traverse network devices 500 of distribution site 420 and access site 410-3, via optical bypass (e.g., network devices 500 of distribution site 420 and access site 410-3 may not process wavelengths of optical signals); and may terminate at network device 500 of access site 410-2 (e.g., at a point marked "6" associated with ODU switch 640). Second ODUk LAG subpath 730-56 may map Ethernet LAG 710-1 (e.g., marked as "a" and "b") to Ethernet LAG 710-3 (e.g., marked as "e" and "f").

When information (e.g., optical signals, such as an Ethernet frame) is provided to the ODUk LAG (e.g., via Ethernet LAG 710-1), network device 500 of access site 410-1 may determine (e.g., based on a hash value, a round robin, or some other technique) whether to forward the information (e.g., a payload of the information) to network device 500 of access site 410-2 via first ODUk LAG subpath 730-34 or second ODUk LAG subpath 730-56. Once network device 500 of access site 410-1 determines the ODUk LAG subpath, network device 500 of access site 410-1 may forward the information to network device 500 of access site 410-2 via the determined ODUk LAG subpath. Accordingly, the information may be passed from Ethernet LAG 710-1 to Ethernet LAG 710-3.

In one example implementation, Ethernet LAGs 410-1 and 410-2 may map onto an ODUk container (e.g., an ODUk container may include a payload envelope that carries signals in a substantially bit-transparent manner), and the ODUk container may map to the OTN.

Although FIG. 7 shows example components of optimal OTN configuration 340, in other implementations, optimal OTN configuration 340 may contain fewer components, different components, differently arranged components, or additional components than depicted in FIG. 7. Alternatively, or additionally, one or more components of optimal OTN configuration 340 may perform one or more other tasks described as being performed by one or more other components of optimal OTN configuration 340.

Returning to FIG. 3, LTE metro links component 315 may include hardware or a combination of hardware and software that may receive LTE traffic patterns 335 from LTE traffic patterns component 305, may receive optimal OTN configuration 340 from optimal OTN component 310, and may receive IP network architecture information 160. LTE metro links component 315 may determine a number of proposed LTE metro OTNs 345 based on LTE traffic patterns 335, optimal OTN configuration 340, and/or IP network architecture information 160. As further shown in FIG. 3, LTE metro links component 315 may provide a number of proposed LTE metro OTNs 345 to transit switching component 320, performance testing component 325, and cost analysis component 330. In one example implementation, LTE metro links component 315 may determine proposed LTE metro OTNs 345 as set forth below in connection with, for example, FIGS. 8-11.

Figure 8:
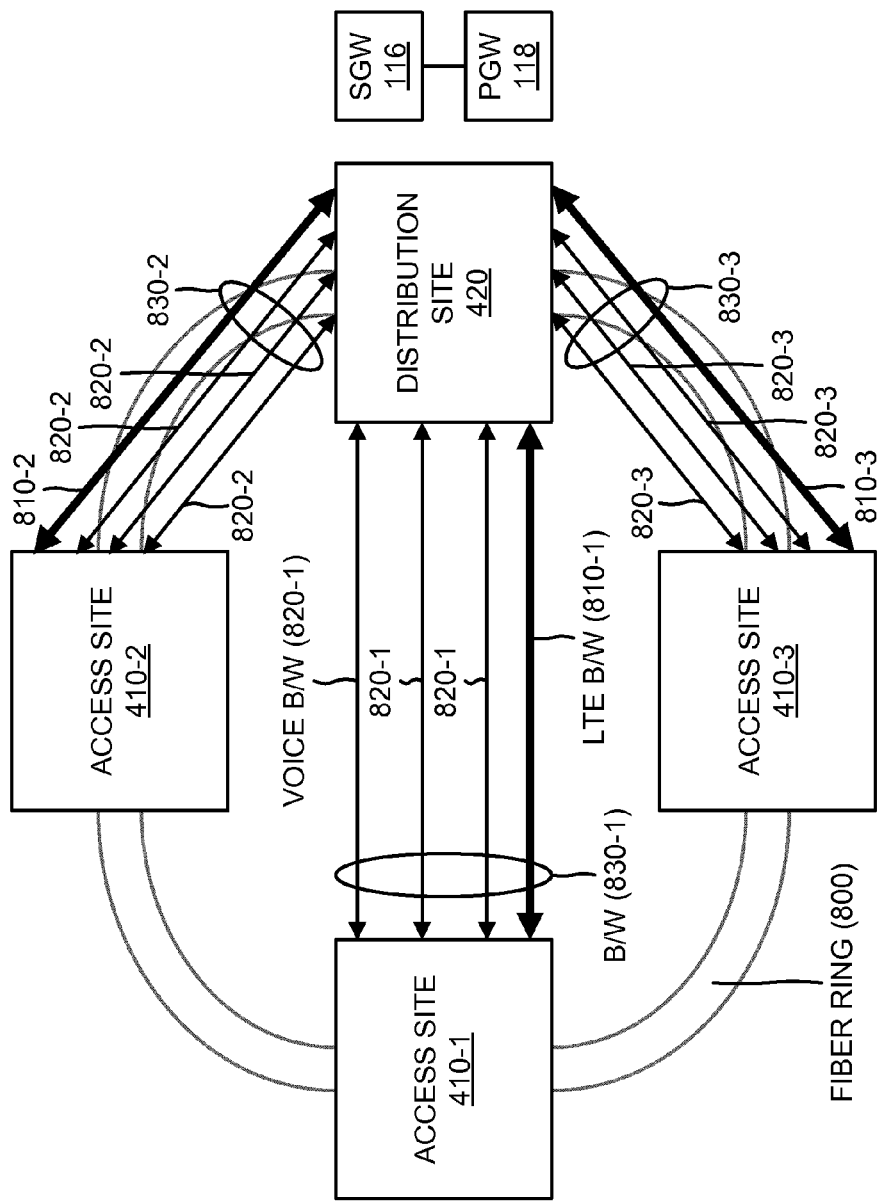
FIG. 8 is a diagram of a proposed LTE metropolitan OTN capable of being generated by a LTE metro links component depicted in FIG. 3.

FIG. 8 is a diagram of one proposed LTE metro OTN 345 capable of being generated by LTE metro links component 315 (FIG. 3). As shown, proposed LTE metro OTN 345 may include SGW 116 and PGW 118 (e.g., of LTE architecture 110); and access sites 410-1, 410-2, and 410-3, and distribution site 420 (e.g., of transport network architecture 130). SGW 116, PGW 118, access sites 410-1, 410-2, and 410-3, and distribution site 420 may include the features described above in connection with, for example, one or more of FIGS. 1-7. In one example implementation, proposed LTE metro OTN 345 of FIG. 8 may correspond to a hub (e.g., distribution 420) and spoke (e.g., access sites 410) architecture.

As further shown in FIG. 8, access sites 410 and distribution site 420 may physically connect via a fiber ring 800. However, optical wavelengths may be point-to-point from access sites 410 to distribution site 420 (e.g., the hub). Such point-to-point links may constitute a major portion of optical network costs due to a number of transponders needed to support them. In the hub and spoke architecture, fewer transponders may be required (e.g., only add and drop traffic may require transponders). As shown in FIG. 8, SGW 116 and PGW 118 may be physically located near distribution site 420 (i.e., the hub).

LTE bandwidth 810-1 (e.g., with "20" Gbps bandwidth for LTE traffic) and three voice bandwidths 820-1 (e.g., with "5" Gbps bandwidth each) may be provided between access site 410-1 and distribution site 420. A total bandwidth 830-1 (e.g., "35" Gbps) between access site 410-1 and distribution site 420 may include the sums of the bandwidths allocated to LTE bandwidth 810-1 and voice bandwidths 820-1. LTE bandwidth 810-2 (e.g., with "20" Gbps bandwidth for LTE traffic) and three voice bandwidths 820-2 (e.g., with "5" Gbps bandwidth each) may be provided between access site 410-2 and distribution site 420. A total bandwidth 830-2 (e.g., "35" Gbps) between access site 410-2 and distribution site 420 may include the sums of the bandwidths allocated to LTE bandwidth 810-2 and voice bandwidths 820-2. LTE bandwidth 810-3 (e.g., with "20" Gbps bandwidth for LTE traffic) and three voice bandwidths 820-3 (e.g., with "5" Gbps bandwidth each) may be provided between access site 410-3 and distribution site 420. A total bandwidth 830-3 (e.g., "35" Gbps) between access site 410-3 and distribution site 420 may include the sums of the bandwidths allocated to LTE bandwidth 810-3 and voice bandwidths 820-3.

Figure 9:
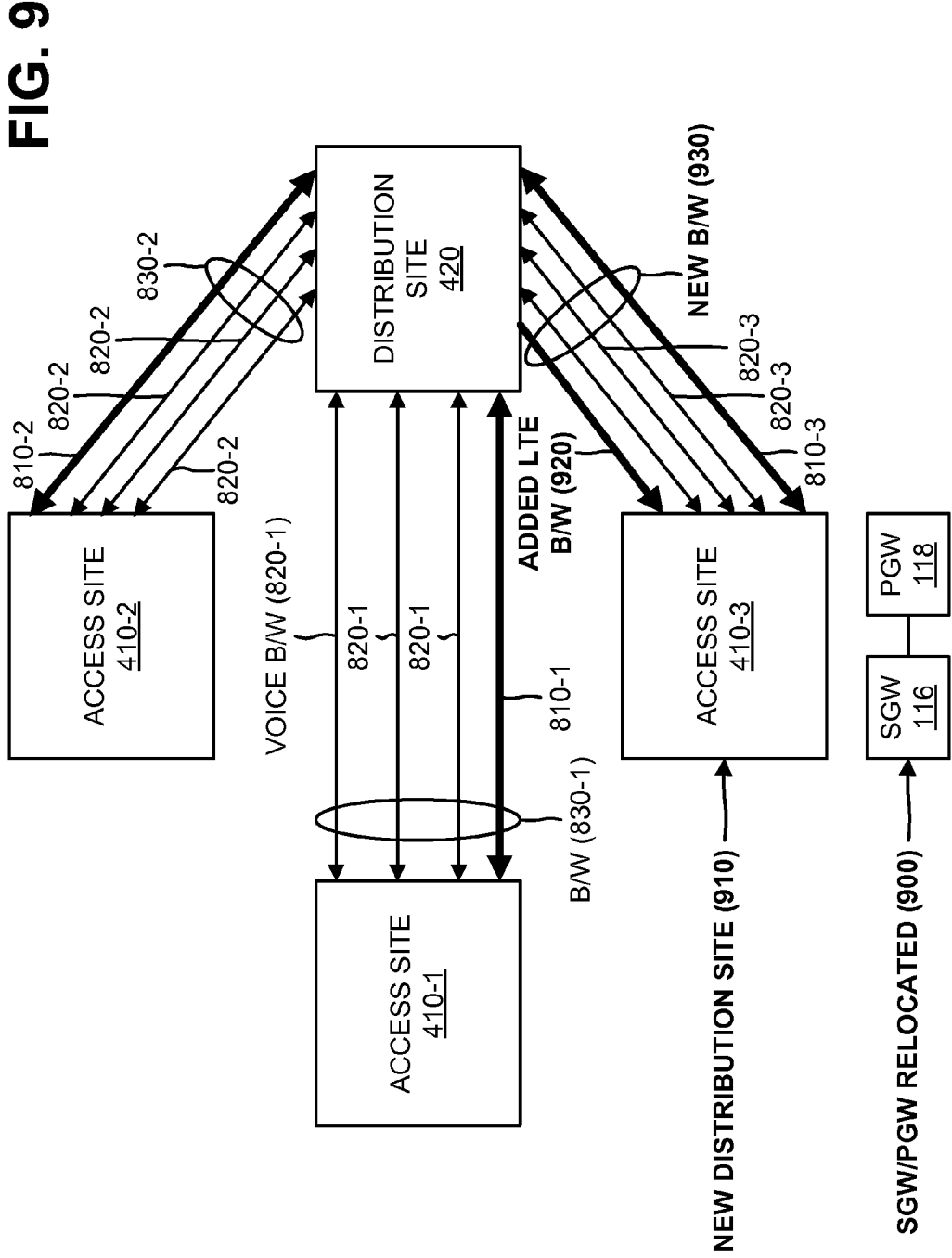
FIG. 9 is a diagram of the proposed LTE metropolitan OTN of FIG. 8, after relocation of a distribution site.

Flexibility, such as how sensitive a LTE metro architecture is to relocations of SGW 116 and PGW 118, may be an important property of the architecture. FIG. 9 is a diagram of proposed LTE metro OTN 345 of FIG. 8, after relocation of distribution site 420. As shown, SGW 116 and PGW 118 may be relocated from distribution site 420 to access site 410-3, as indicated by reference number 900. Thus, access site 410-3 may be considered a new distribution site 910. If new distribution site 910 (e.g., access site 410-3) needs additional capacity (e.g., bandwidth), distribution site 420 may allocate additional LTE bandwidth 920 (e.g., with "20" Gbps bandwidth for LTE traffic). Thus, a new bandwidth 930 (e.g., "55" Gbps) between access site 410-3 and distribution site 420 may include the sums of the bandwidths allocated to LTE bandwidth 810-3, voice bandwidths 820-3, and additional LTE bandwidth 920.

In proposed LTE metro OTN 345 of FIGS. 8 and 9, the physical fiber (e.g., fiber ring 800) may be decoupled from the wavelengths and VLANs may map to multiple wavelength spans using optical bypass. Thus, adding an additional SGW 116 and PGW 118, or relocating SGW 116 and PGW 118, may require simple wavelength reconfigurations using optical bypass at transit locations. If more capacity is needed, proposed LTE metro OTN 345 may simply add more wavelengths.

Figure 10:
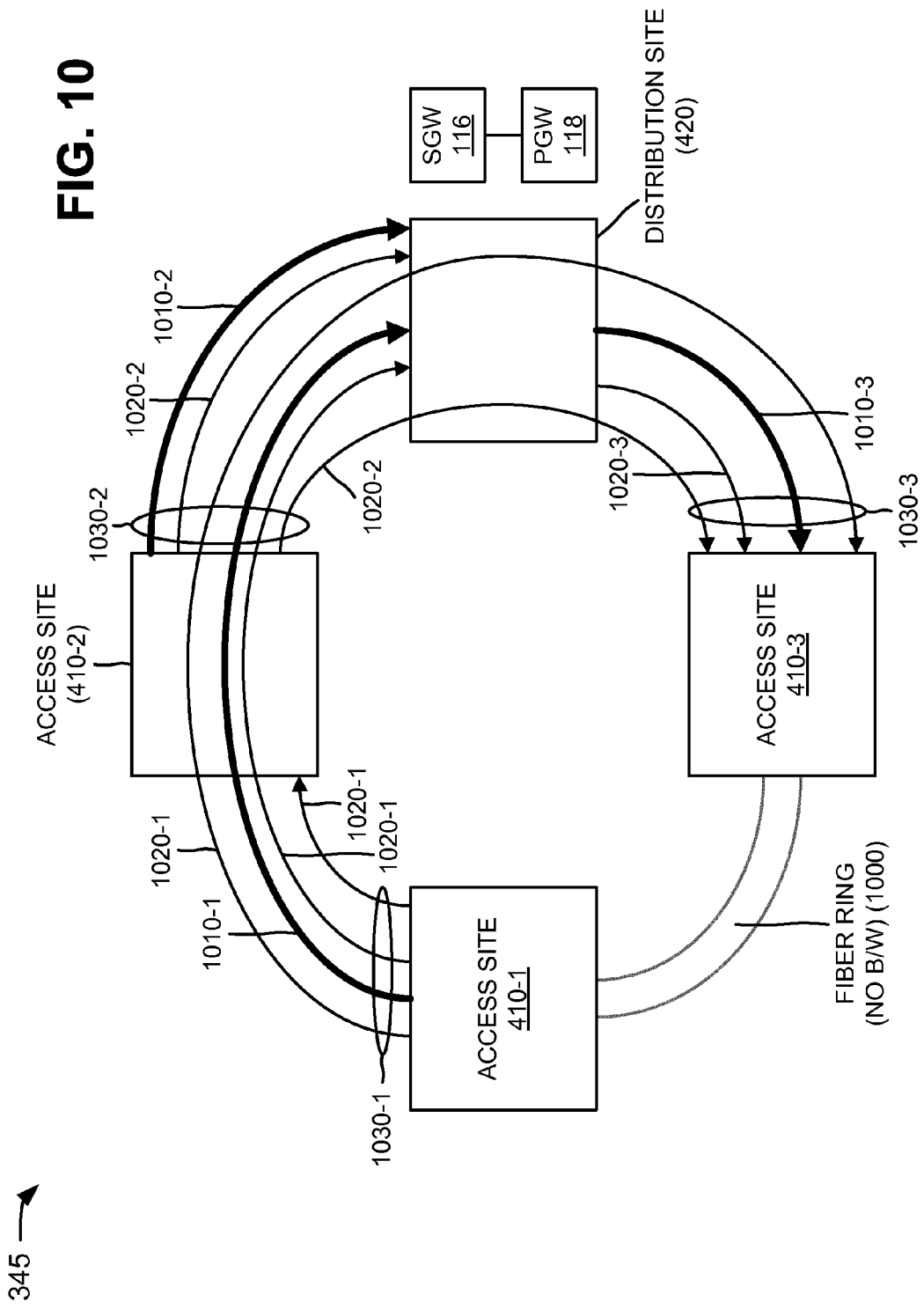
FIG. 10 is a diagram of another proposed LTE metropolitan OTN capable of being generated by the LTE metro links component depicted in FIG. 3.

FIG. 10 is a diagram of another proposed LTE metropolitan OTN 345 capable of being generated by LTE metro links component 315 (FIG. 3). As shown, proposed LTE metro OTN 345 may include SGW 116, PGW 118, access sites 410-1, 410-2, and 410-3, and distribution site 420. SGW 116, PGW 118, access sites 410-1, 410-2, and 410-3, and distribution site 420 may include the features described above in connection with, for example, one or more of FIGS. 1-9. In one example implementation, proposed LTE metro OTN 345 of FIG. 10 may correspond to a ring architecture.

Figure 11:
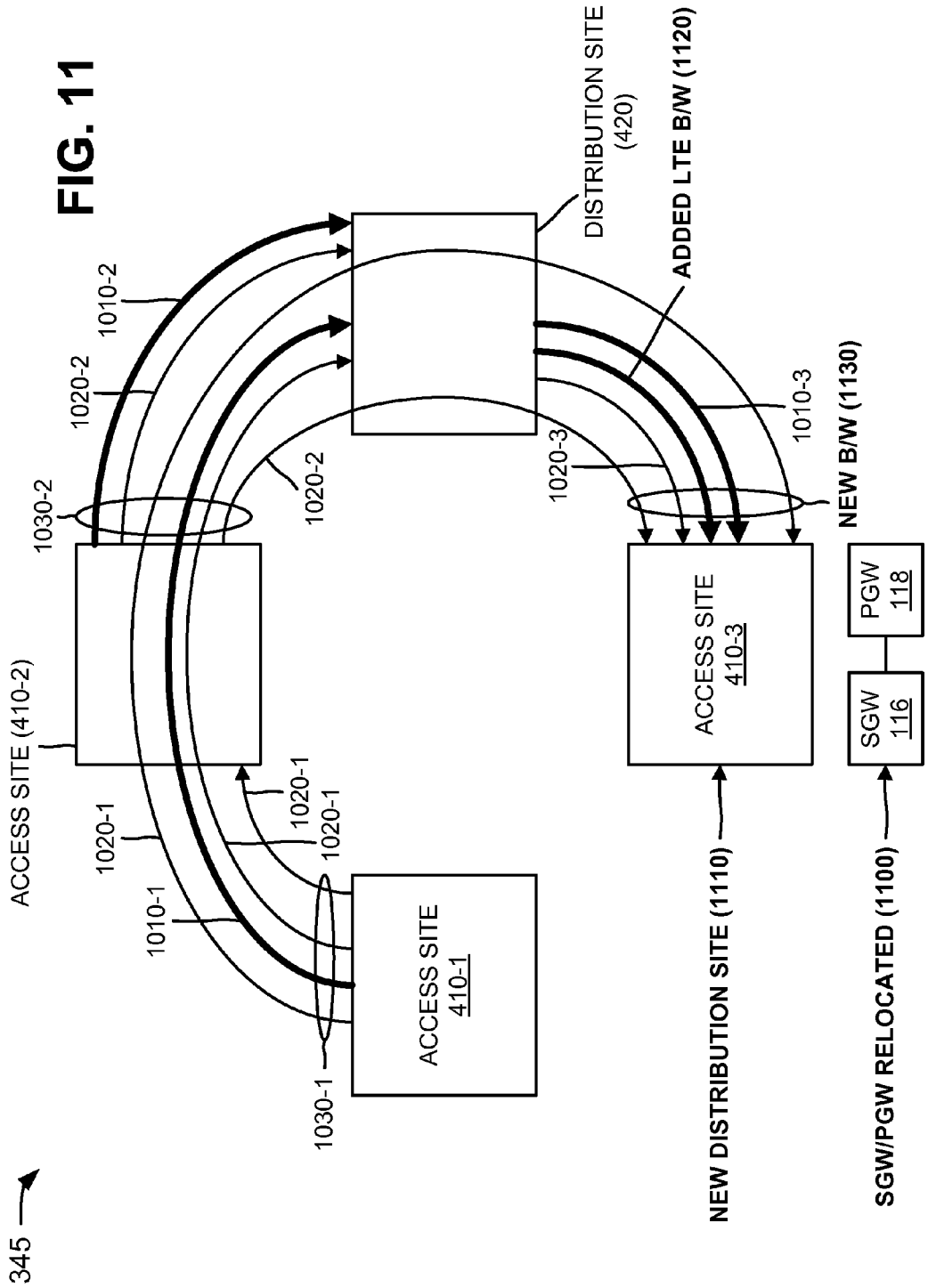
FIG. 11 is a diagram of the other proposed LTE metropolitan OTN of FIG. 10, after relocation of a distribution site.

As further shown in FIG. 10, access sites 410 and distribution site 420 may physically connect via a fiber ring 1000. However, optical wavelengths may be point-to-point from access site 410 to access site 410 and/or distribution site 420. Such point-to-point links may constitute a major portion of optical network costs due to a number of transponders needed to support them. In the ring architecture (e.g., as shown in FIGS. 10 and 11), more transponders may be required to process transit traffic. As shown in FIG. 10, SGW 116 and PGW 118 may be physically located near distribution site 420.

LTE bandwidth 1010-1 (e.g., with "20" Gbps bandwidth for LTE traffic) may be provided between access site 410-1 and distribution site 420. Voice bandwidth 1020-1 (e.g., with "5" Gbps bandwidth) may be provided between access site 410-1 and access site 410-2; voice bandwidth 1020-1 (e.g., with "5" Gbps bandwidth) may be provided between access site 410-1 and distribution site 420; and voice bandwidth 1020-1 (e.g., with "5" Gbps bandwidth) may be provided between access site 410-1 and access site 410-3. A total bandwidth 1030-1 (e.g., "35" Gbps) between access site 410-1 and access site 410-2 may include the sums of the bandwidths allocated to LTE bandwidth 1010-1 and voice bandwidths 1020-1.

LTE bandwidth 1010-2 (e.g., with "20" Gbps bandwidth for LTE traffic) may be provided between access site 410-2 and distribution site 420. Voice bandwidth 1020-2 (e.g., with "5" Gbps bandwidth) may be provided between access site 410-2 and distribution site 420; and voice bandwidth 1020-2 (e.g., with "5" Gbps bandwidth) may be provided between access site 410-2 and access site 410-3. A total bandwidth 1030-2 (e.g., "60" Gbps) between access site 410-2 and distribution site 420 may include the sums of the bandwidths allocated to LTE bandwidths 1010-1 and 1010-2, two voice bandwidths 1020-1, and two voice bandwidths 1020-2.

LTE bandwidth 1010-3 (e.g., with "20" Gbps bandwidth for LTE traffic) and voice bandwidth 1020-3 (e.g., with "5" Gbps bandwidth) may be provided between access site 410-3 and distribution site 420. A total bandwidth 1030-3 (e.g., "35" Gbps) between access site 410-3 and distribution site 420 may include the sums of the bandwidths allocated to LTE bandwidth 1010-3, voice bandwidth 1020-1, voice bandwidth 1020-2, and voice bandwidth 1020-3. No bandwidth may be allocated between access site 410-1 and access site 410-3.

Flexibility, such as how sensitive a LTE metro architecture is to relocations of SGW 116 and PGW 118, may be an important property of the architecture. FIG. 11 is a diagram of proposed LTE metro OTN 345 of FIG. 10, after relocation of distribution site 420. As shown, SGW 116 and PGW 118 may be relocated from distribution site 420 to access site 410-3, as indicated by reference number 1100. Thus, access site 410-3 may be considered a new distribution site 1110. If new distribution site 1110 (e.g., access site 410-3) needs additional capacity (e.g., bandwidth), distribution site 420 may allocate additional LTE bandwidth 1120 (e.g., with "20" Gbps bandwidth for LTE traffic). Thus, a new bandwidth 1130 (e.g., "55" Gbps) between access site 410-3 and distribution site 420 may include the sums of the bandwidths allocated to LTE bandwidth 1010-3, voice bandwidth 1020-1, voice bandwidth 1020-2, voice bandwidth 1020-3, and additional LTE bandwidth 1120.

In proposed LTE metro OTN 345 of FIGS. 10 and 11, nodes (e.g., access sites 410 and distribution site 420) may need to process transit traffic, which may impact the ring architecture due to a change in traffic patterns that may result when SGW 116 and PGW 118 are added or moved (e.g., as in FIG. 11). Thus, the ring architecture (e.g., depicted in FIGS. 10 and 11) may be less flexible than the hub and spoke architecture (e.g., depicted in FIGS. 8 and 9).

Although FIGS. 8-11 show example components of proposed LTE metro OTN 345, in other implementations, proposed LTE metro OTN 345 may contain fewer components, different components, differently arranged components, or additional components than depicted in FIGS. 8-11. Alternatively, or additionally, one or more components of proposed LTE metro OTN 345 may perform one or more other tasks described as being performed by one or more other components of proposed LTE metro OTN 345.

Returning to FIG. 3, transit switching component 320 may include hardware or a combination of hardware and software that may receive proposed LTE metro OTNs 345 from LTE metro links component 315, and may receive transport network information 170. Transit switching component 320 may determine transit switching 350 for proposed LTE metro OTNs 345 (e.g., based on transport network information 170). As further shown in FIG. 3, transit switching component 320 may provide transit switching 350 to performance testing component 325. In one example implementation, transit switching component 320 may determine proposed transit switching 350 as set forth below in connection with, for example, FIGS. 12 and 13.

Figure 12:
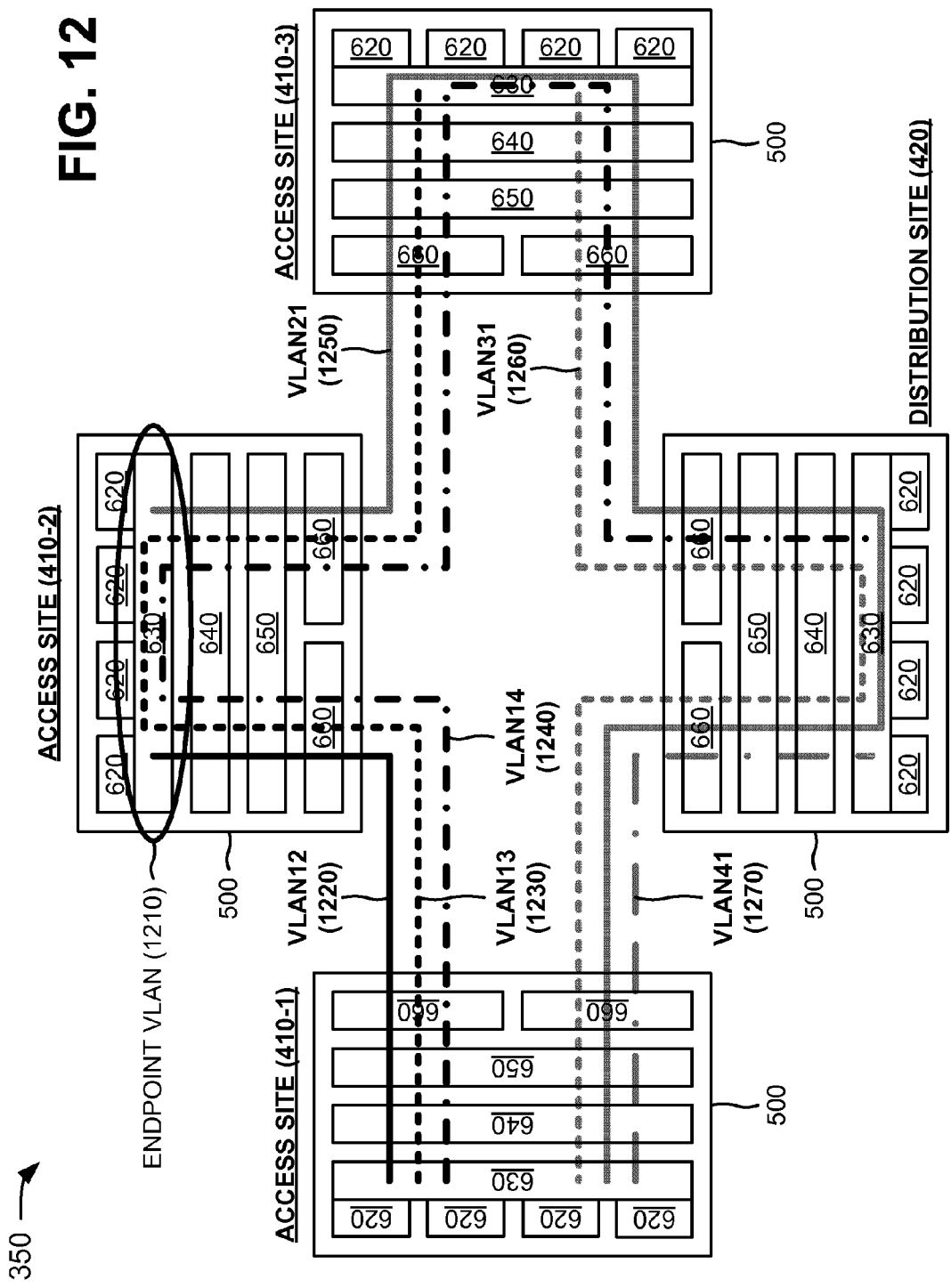
FIG. 12 is a diagram of transit switching capable of being generated by a transit switching component depicted in FIG. 3.

FIG. 12 is a diagram of transit switching 350 capable of being generated by transit switching component 320. As shown, transit switching 350 may include access sites 410-1, 410-2, and 410-3, distribution site 420, and network devices 500. Access sites 410-1, 410-2, and 410-3, distribution site 420, and network devices 500 may include the features described above in connection with, for example, one or more of FIGS. 1-11. Network devices 500 (e.g., via transponders 360) of access sites 410 and distribution site 420 may physically interconnect via optical communication media (e.g., optical fibers), not shown in FIG. 12 for clarity.

In one example implementation, transit switching 350 of FIG. 12 may depict a Layer 2 (or Data Link Layer) transit switching approach with point-to-point wavelength transport. As further shown in FIG. 12, a variety of VLANs may be provided for transit switching 350. A VLAN may include a group of devices with a common set of requirements that communicate as if the devices were attached to the same broadcast domain, regardless of the physical locations of the devices. A VLAN may include the same attributes as a physical LAN, but a VLAN may permit ports to be grouped together even if the ports are not located on the same network device. The VLANs of transit switching 350 may be multiplexed onto an ODUk container or an OTN LAG (e.g., the OCh and ODUk LAGs depicted in FIG. 7), and may be mapped to a particular wavelength.

In one example, an endpoint VLAN 1210 may be provided at network device 500 (e.g., at Ethernet switch 630) of access site 410-2. Transit traffic provided at endpoint VLAN 1210 may be Layer 2 switched. A VLAN (e.g., VLAN12) 1220 may be provided from network device 500 of access site 410-1 to network device 500 of access site 410-2, and may connect access site 410-1 to access site 410-2. Another VLAN (e.g., VLAN13) 1230 may be provided from network device 500 of access site 410-1 to network device 500 of access site 410-3, via network device 500 of access site 410-2. VLAN 1230 may connect access site 410-1 to access site 410-3. Still another VLAN (e.g., VLAN14) 1240 may be provided from network device 500 of access site 410-1 to network device 500 of distribution site 420, via network devices 500 of access site 410-2 and access site 410-3. VLAN 1240 may connect access site 410-1 to distribution site 420.

As further shown in FIG. 12, a VLAN (e.g., VLAN21) 1250 may be provided from network device 500 of access site 410-2 to network device 500 of access site 410-1, via network devices 500 of access site 410-3 and distribution site 420. VLAN 1250 may connect access site 410-2 to access site 410-1. Another VLAN (e.g., VLAN31) 1260 may be provided from network device 500 of access site 410-3 to network device 500 of access site 410-1, via network device 500 of distribution site 420. VLAN 1260 may connect access site 410-3 to access site 410-1. Still another VLAN (e.g., VLAN41) 1270 may be provided from network device 500 of distribution site 420 to network device 500 of access site 410-1, and may connect distribution site 420 to access site 410-1.

Figure 13:
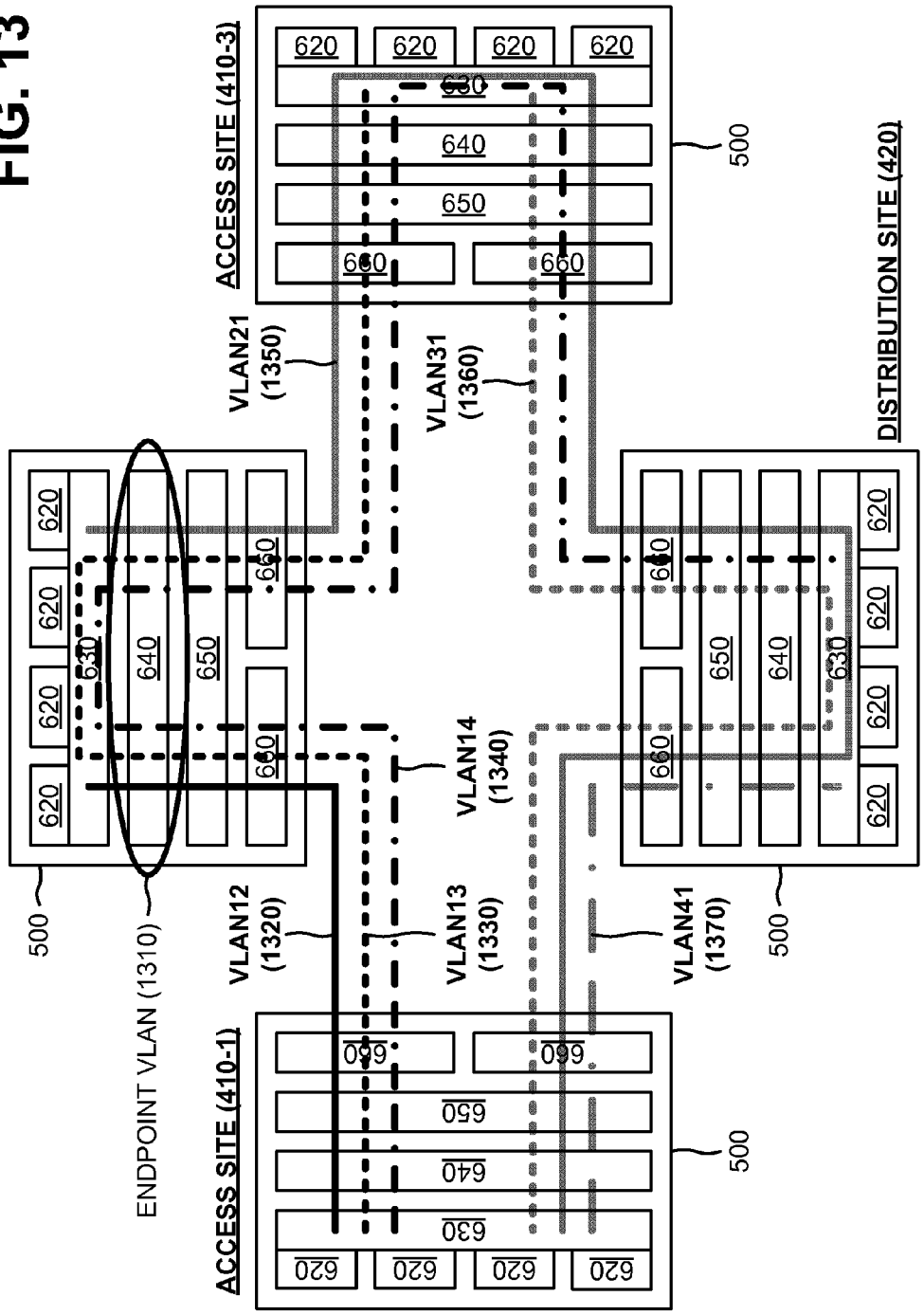
FIG. 13 is a diagram of additional transit switching capable of being generated by the transit switching component depicted in FIG. 3.

FIG. 13 is a diagram of additional transit switching 350 capable of being generated by transit switching component 320. As shown, transit switching 350 may include access sites 410-1, 410-2, and 410-3, distribution site 420, and network devices 500. Access sites 410-1, 410-2, and 410-3, distribution site 420, and network devices 500 may include the features described above in connection with, for example, one or more of FIGS. 1-12. Network devices 500 (e.g., via transponders 660) of access sites 410 and distribution site 420 may physically interconnect via optical communication media (e.g., optical fibers), not shown in FIG. 13 for clarity.

In one example implementation, transit switching 350 of FIG. 13 may depict an ODUk layer transit switching approach with point-to-point ODUk transport. As further shown in FIG. 13, a variety of VLANs may be provided for transit switching 350. The VLANs of transit switching 350 may map to an ODUk container, and the ODUk layer may decide to transmit or drop a VLAN based on the ODUk container. ODUk containers may coalesce at transit using ODUflex (e.g., a lower order ODU container of the OTN hierarchy).

In one example, an endpoint VLAN 1310 may be provided at network device 500 (e.g., at ODU switch 640) of access site 410-2. Transit traffic provided at endpoint VLAN 1310 may be ODU multiplexed with ODUflex and switched. A VLAN (e.g., VLAN12) 1320 may be provided from network device 500 of access site 410-1 to network device 500 of access site 410-2, and may connect access site 410-1 to access site 410-2. Another VLAN (e.g., VLAN13) 1330 may be provided from network device 500 of access site 410-1 to network device 500 of access site 410-3, via network device 500 of access site 410-2. VLAN 1330 may connect access site 410-1 to access site 410-3. Still another VLAN (e.g., VLAN14) 1340 may be provided from network device 500 of access site 410-1 to network device 500 of distribution site 420, via network devices 500 of access site 410-2 and access site 410-3. VLAN 1340 may connect access site 410-1 to distribution site 420.

As further shown in FIG. 13, a VLAN (e.g., VLAN21) 1350 may be provided from network device 500 of access site 410-2 to network device 500 of access site 410-1, via network devices 500 of access site 410-3 and distribution site 420. VLAN 1350 may connect access site 410-2 to access site 410-1. Another VLAN (e.g., VLAN31) 1360 may be provided from network device 500 of access site 410-3 to network device 500 of access site 410-1, via network device 500 of distribution site 420. VLAN 1360 may connect access site 410-3 to access site 410-1. Still another VLAN (e.g., VLAN41) 1370 may be provided from network device 500 of distribution site 420 to network device 500 of access site 410-1, and may connect distribution site 420 to access site 410-1.

Although FIGS. 12 and 13 show example components of transit switching 350, in other implementations, transit switching 350 may contain fewer components, different components, differently arranged components, or additional components than depicted in FIGS. 12 and 13. Alternatively, or additionally, one or more components of transit switching 350 may perform one or more other tasks described as being performed by one or more other components of transit switching 350.

Returning to FIG. 3, performance testing component 325 may include hardware or a combination of hardware and software that may receive proposed LTE metro OTNs 345 from LTE metro links component 315, and may receive transit switching 350 from transit switching component 320. Performance testing component 325 may conduct performance tests on proposed LTE metro OTNs 345 (e.g., based on transit switching 350), and may generate performance results 355 (e.g., performance comparisons of proposed LTE metro OTNs 345) based on the performance tests. As further shown in FIG. 3, performance testing component 325 may provide performance results 355 to cost analysis component 330. In one example implementation, performance testing component 325 may generate performance results 355 as set forth below in connection with, for example, FIGS. 14 and 15.

Figure 14:
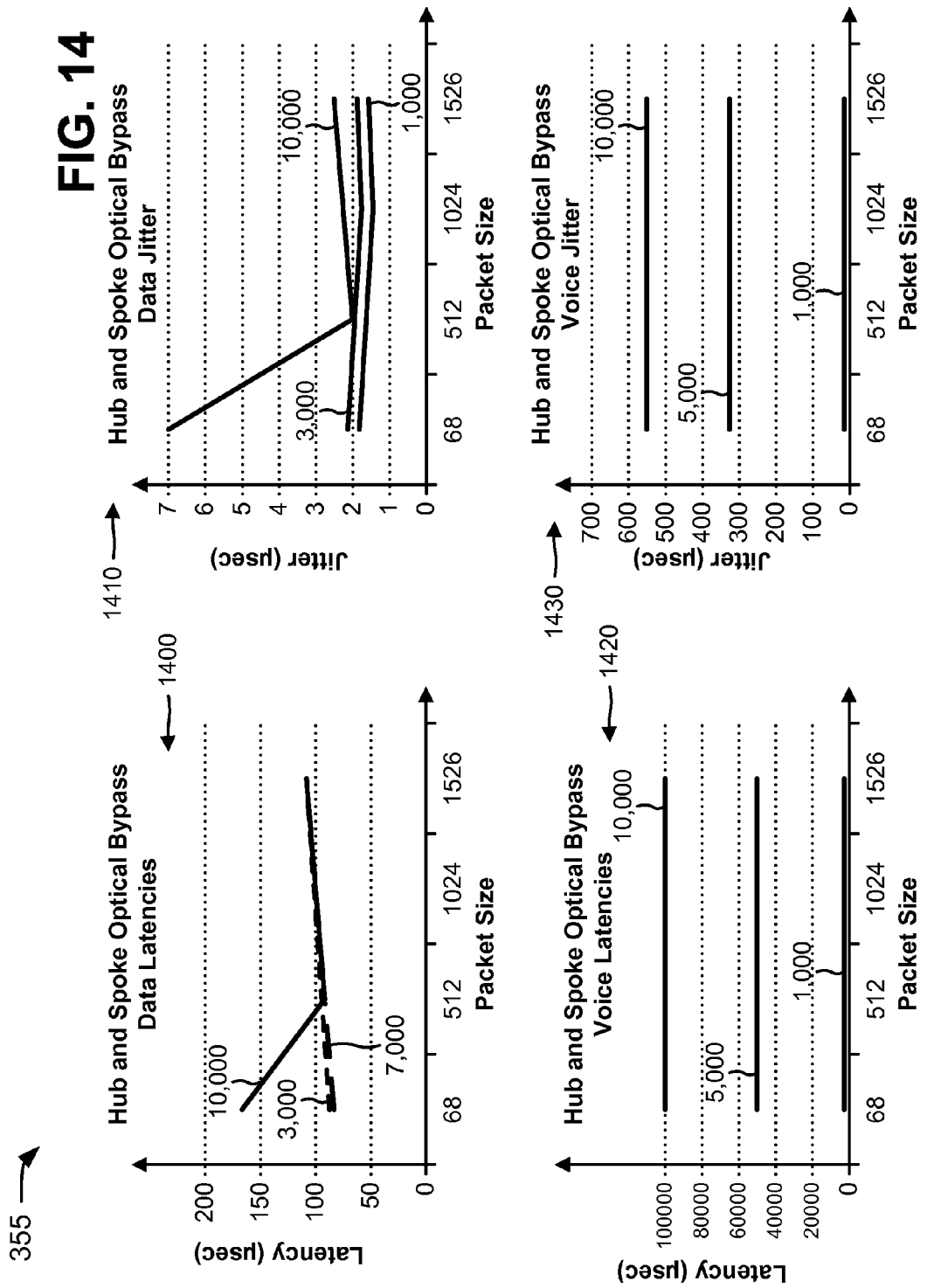
FIG. 14 is a diagram of example performance results, for the proposed LTE metropolitan OTN of FIGS. 8 and 9, capable of being generated by a performance testing component depicted in FIG. 3.

FIG. 14 is a diagram of example performance results 355 (e.g., for proposed LTE metro OTN 345, the hub and spoke architecture, of FIGS. 8 and 9) capable of being generated by performance testing component 325. As shown, performance results 355 may include a first graph 1400, a second graph 1410, a third graph 1420, and a fourth graph 1430. Graphs 1400-1430 may portray latency or jitter (e.g., in microseconds (μsec)) versus packet size (e.g., in bytes). Latency (or delay) may refer to an amount of time it takes a bit to be transmitted from a source to a destination. One way to view latency is how long a system holds on to a packet. Jitter may include delay that varies over time, a deviation in or displacement of some aspect of pulses in a high-frequency digital signal, etc.

First graph 1400 may depict how latency (e.g., in μsec) may change by varying packet sizes (e.g., in bytes) of data traffic. The latency versus packet size measurements of first graph 1400 may be performed for different bit rates (e.g., "3,000," "7,000," or "10,000" megabits per second (Mbps)) of data traffic associated with the hub and spoke architecture (e.g., depicted in FIGS. 8 and 9).

Second graph 1410 may depict how jitter (e.g., in μsec) may change by varying packet sizes (e.g., in bytes) of data traffic. The latency versus packet size measurements of second graph 1410 may be performed for different bit rates (e.g., "1,000," "3,000," or "10,000" Mbps) of data traffic associated with the hub and spoke architecture (e.g., depicted in FIGS. 8 and 9).

Third graph 1420 may depict how latency (e.g., in μsec) may change by varying packet sizes (e.g., in bytes) of voice traffic. The latency versus packet size measurements of third graph 1420 may be performed for different bit rates (e.g., "1,000," "5,000," or "10,000" Mbps) of voice traffic associated with the hub and spoke architecture (e.g., depicted in FIGS. 8 and 9).

Fourth graph 1430 may depict how jitter (e.g., in μsec) may change by varying packet sizes (e.g., in bytes) of voice traffic. The latency versus packet size measurements of fourth graph 1430 may be performed for different bit rates (e.g., "1,000," "5,000," or "10,000" Mbps) of voice traffic associated with the hub and spoke architecture (e.g., depicted in FIGS. 8 and 9).

Figure 15:
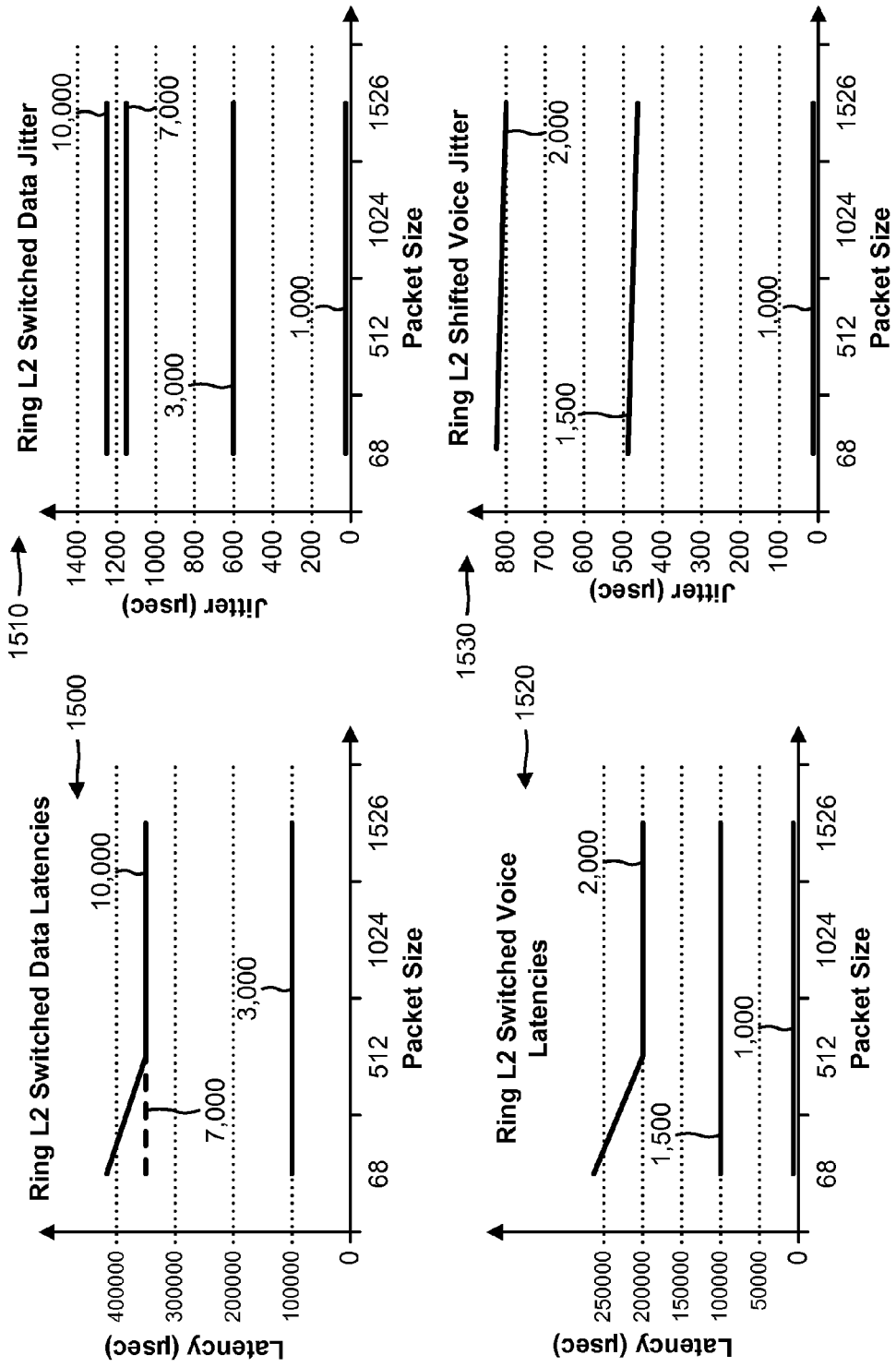
FIG. 15 is a diagram of example performance results, for the proposed LTE metropolitan OTN of FIGS. 10 and 11, capable of being generated by the performance testing component depicted in FIG. 3.

FIG. 15 is a diagram of example performance results 355 (e.g., for proposed LTE metro OTN 345, the ring architecture, of FIGS. 10 and 11) capable of being generated by performance testing component 325. As shown, performance results 355 may include a first graph 1500, a second graph 1510, a third graph 1520, and a fourth graph 1530.

First graph 1500 may depict how latency (e.g., in μsec) may change by varying packet sizes (e.g., in bytes) of data traffic. The latency versus packet size measurements of first graph 1500 may be performed for different bit rates (e.g., "3,000," "7,000," or "10,000" Mbps) of data traffic associated with the ring architecture (e.g., depicted in FIGS. 10 and 11).

Second graph 1510 may depict how jitter (e.g., in μsec) may change by varying packet sizes (e.g., in bytes) of data traffic. The latency versus packet size measurements of second graph 1510 may be performed for different bit rates (e.g., "1,000," "3,000," "7,000," or "10,000" Mbps) of data traffic associated with the ring architecture (e.g., depicted in FIGS. 10 and 11).

Third graph 1520 may depict how latency (e.g., in μsec) may change by varying packet sizes (e.g., in bytes) of voice traffic. The latency versus packet size measurements of third graph 1520 may be performed for different bit rates (e.g., "1,000," "1,500," or "2,000" Mbps) of voice traffic associated with the ring architecture (e.g., depicted in FIGS. 10 and 11).

Fourth graph 1530 may depict how jitter (e.g., in μsec) may change by varying packet sizes (e.g., in bytes) of voice traffic. The latency versus packet size measurements of fourth graph 1530 may be performed for different bit rates (e.g., "1,000," "1,500," or "2,000" Mbps) of voice traffic associated with the ring architecture (e.g., depicted in FIGS. 10 and 11).

Although FIGS. 14 and 15 show example information of performance results 355, in other implementations, performance results 355 may contain less information, different information, differently arranged information, or additional information than depicted in FIGS. 14 and 15.

Returning to FIG. 3, cost analysis component 330 may include hardware or a combination of hardware and software that may receive proposed LTE metro OTNs 345 from LTE metro links component 315, and may receive performance results 355 from performance testing component 325. Cost analysis component 330 may conduct a cost analysis of proposed LTE metro OTNS 345, and may select optimal LTE metro OTN 180 (e.g., from proposed LTE metro OTNs 345) based on performance results 355 and results of the cost analysis. As further shown in FIG. 3, cost analysis component 330 may output optimal LTE metro OTN 180 (e.g., to a user of computing device 140). In one example implementation, cost analysis component 330 may generate cost analysis results as set forth below in connection with, for example, FIG. 16.

Figure 16:
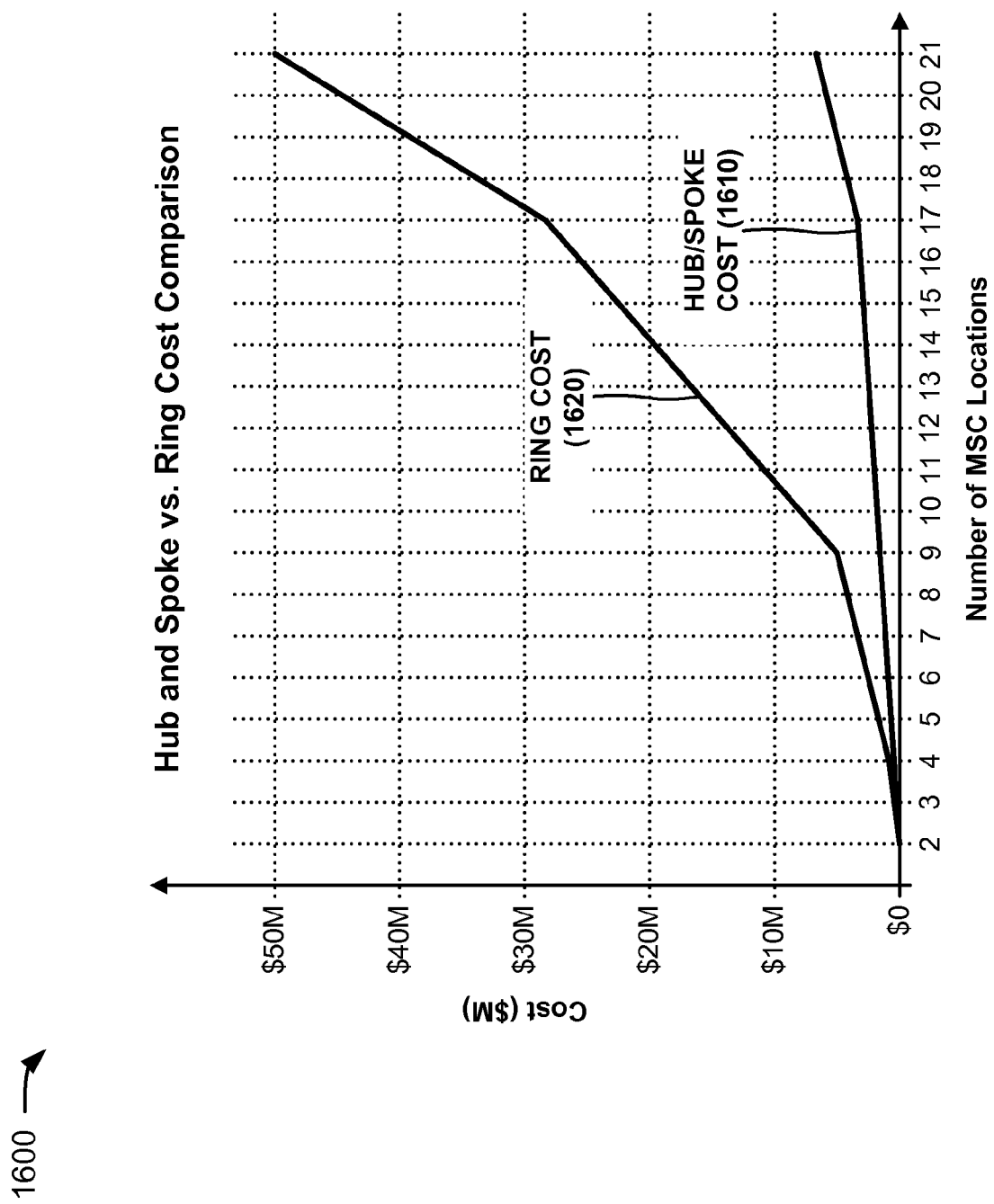
FIG. 16 is a diagram of an example cost analysis capable of being generated by a cost analysis component depicted in FIG. 3.

FIG. 16 is a diagram of an example cost analysis 1600 capable of being generated by cost analysis component 330. As shown, cost analysis 1600 may provide a cost comparison between the hub and spoke architecture (e.g., depicted in FIGS. 8 and 9) versus the ring architecture (e.g., depicted in FIGS. 10 and 11). Cost analysis 1600 may plot cost (e.g., in millions of dollars) versus a number of MSC locations (e.g., access site 410 or distribution site 420 locations). As can be seen from cost analysis 1600, as the number of MSC locations increases, a cost 1610 associated with the hub and spoke architecture increases much more gradually than a cost 1620 associated with the ring architecture.

Although FIG. 16 shows example information of cost analysis 1600, in other implementations, cost analysis 1600 may contain less information, different information, differently arranged information, or additional information than depicted in FIG. 16.

Although FIG. 3 shows example functional components of optimizing tool 145, in other implementations, optimizing tool 145 may include fewer functional components, different functional components, differently arranged functional components, or additional functional components than depicted in FIG. 3. Alternatively, or additionally, one or more functional components of optimizing tool 145 may perform one or more other tasks described as being performed by one or more other functional components of optimizing tool 145.

Figure 17:
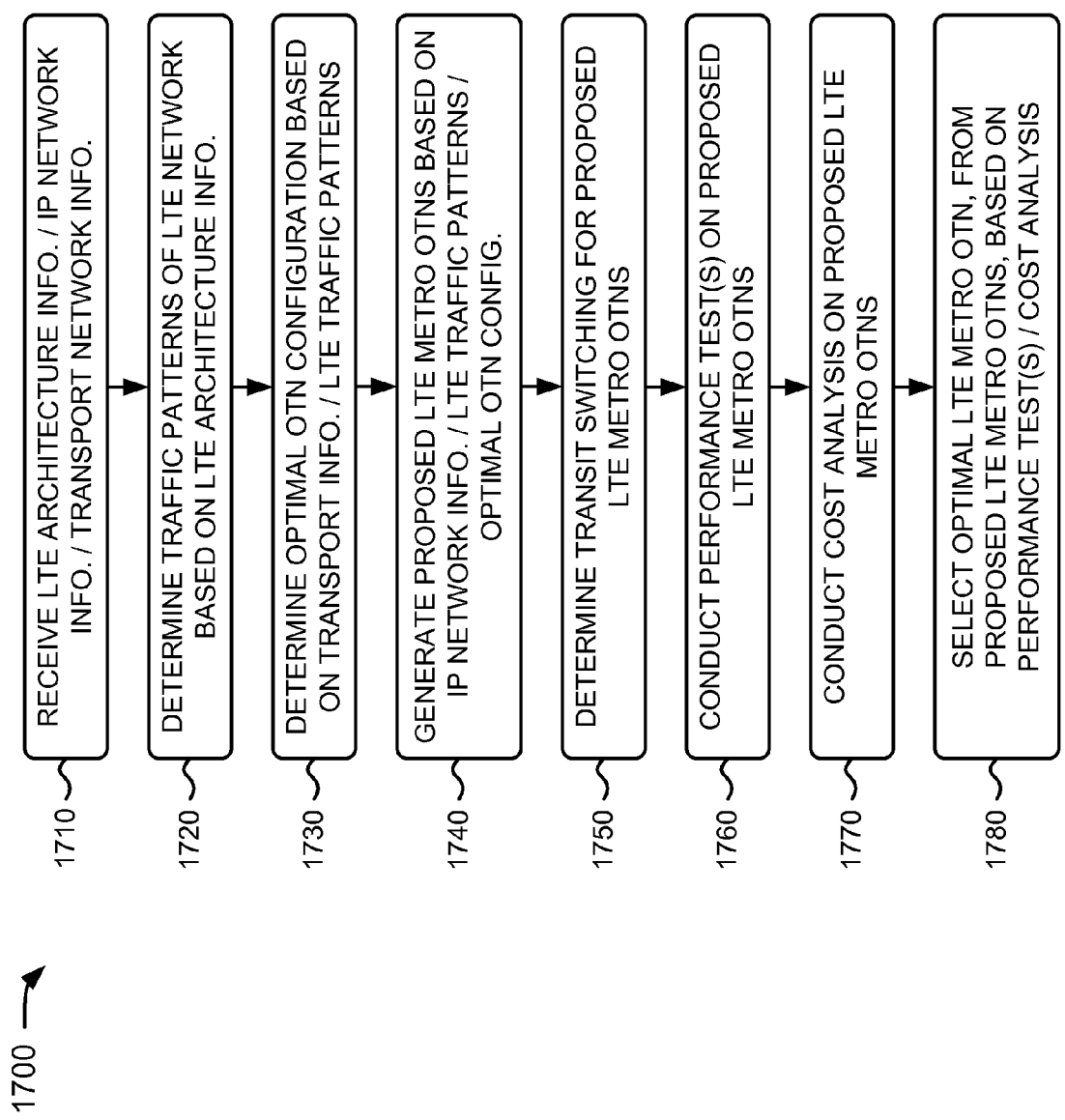
FIG. 17 is a flow chart of an example process for determining metropolitan OTN architectures optimized for LTE networks according to implementations described herein.

FIG. 17 is a flow chart of an example process 1700 for determining metropolitan OTN architectures optimized for LTE networks according to implementations described herein. In one implementation, process 1700 may be performed by computing device 140 (e.g., via optimizing tool 145). In another implementation, some or all of process 1700 may be performed by another device or group of devices, including or excluding computing device 140.

As shown in FIG. 17, process 1700 may include receiving LTE architecture information, IP network information, and transport network information (block 1710), and determining traffic patterns of the LTE network based on the LTE architecture information (block 1720). For example, in implementations described above in connection with FIGS. 1 and 3, computing device 140 may receive LTE architecture information 150 from LTE architecture 110, IP network architecture information 160 from IP network architecture 120, and transport network information 170 from transport network architecture 130. Computing device 140 may provide information 150-170 to optimizing tool 145. LTE traffic patterns component 305 of optimizing tool 145 may receive LTE architecture information 150, and may determine traffic patterns 335 of LTE architecture 110 based on LTE architecture information 150.

As further shown in FIG. 17, process 1700 may include determining an optimal OTN configuration based on the transport network information and/or the LTE traffic patterns (block 1730), and generating proposed LTE metro OTNs based on the IP network information, the LTE traffic patterns, and/or the optimal OTN configuration (block 1740). For example, in implementations described above in connection with FIG. 3, optimal OTN component 310 of optimizing tool 145 may receive LTE traffic patterns 335 from LTE traffic patterns component 305, and may receive transport network information 170. Optimal OTN component 310 may determine optimal OTN configuration 340 based on LTE traffic patterns 335 and/or transport network information 170. LTE metro links component 315 of optimizing tool 145 may receive LTE traffic patterns 335 from LTE traffic patterns component 305, may receive optimal OTN configuration 340 from optimal OTN component 310, and may receive IP network architecture information 160. LTE metro links component 315 may determine a number of proposed LTE metro OTNs 345 based on LTE traffic patterns 335, optimal OTN configuration 340, and/or IP network architecture information 160.

Returning to FIG. 17, process 1700 may include determining transit switching for the proposed LTE metro OTNs (block 1750), and conducting performance test(s) on the proposed LTE metro OTNs (block 1760). For example, in implementations described above in connection with FIG. 3, transit switching component 320 of optimizing tool 145 may receive proposed LTE metro OTNs 345 from LTE metro links component 315, and may receive transport network information 170. Transit switching component 320 may determine transit switching 350 for proposed LTE metro OTNs 345 (e.g., based on transport network information 170). Performance testing component 325 of optimizing tool 145 may receive proposed LTE metro OTNs 345 from LTE metro links component 315, and may receive transit switching 350 from transit switching component 320. Performance testing component 325 may conduct performance tests on proposed LTE metro OTNS 345 (e.g., based on transit switching 350), and may generate performance results 355 based on the performance tests.

As further shown in FIG. 17, process 1700 may include conducting a cost analysis on the proposed LTE metro OTNs (block 1770), and selecting an optimal LTE metro OTN, from the proposed LTE metro OTNs, based on the performance test(s) and the cost analysis (block 1780). For example, in implementations described above in connection with FIG. 3, cost analysis component 330 of optimizing tool 145 may receive proposed LTE metro OTNs 345 from LTE metro links component 315, and may receive performance results 355 from performance testing component 325. Cost analysis component 330 may conduct a cost analysis of proposed LTE metro OTNS 345, and may select optimal LTE metro OTN 180 (e.g., from proposed LTE metro OTNs 345) based on performance results 355 and results of the cost analysis.

Systems and/or methods described herein may provide a scalable, cost effective, and flexible approach to designing optimal metropolitan OTNs to support LTE networks. In one example implementation, the systems and/or methods may utilize LTE architecture information, IP network architecture information, and transport network information to carry out performance tests and cost analyses for various types of metropolitan OTNs for LTE networks. The systems and/or methods may determine a metropolitan OTN optimized for LTE networks based on the performance tests and cost analyses.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with regard to FIG. 17, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
receiving, by the computing device, Long Term Evolution (LTE) architecture information, Internet protocol (IP) network architecture information, and transport network information;
determining, by the computing device, traffic patterns of a LTE network based on the LTE architecture information;
generating, by the computing device, proposed LTE metropolitan optical transport networks (OTNs) based on the determined traffic patterns and one or more of the LTE architecture information, the IP network architecture information, and the transport network information;
determining, by the computing device, transit switching for the proposed LTE metropolitan OTNs;
conducting, by the computing device, a performance test on the proposed LTE metropolitan OTNs;
conducting, by the computing device, a cost analysis on the proposed LTE metropolitan OTNs; and
selecting, by the computing device and from the proposed LTE metropolitan OTNs, a metropolitan OTN optimized for the LTE network, based on one or more of the transit switching, the performance test, or the cost analysis.

2. The method of claim 1, further comprising:
determining an optimal OTN configuration based on the transport network information and the determined traffic patterns.

3. The method of claim 1, where the selected metropolitan OTN optimized for the LTE network includes a hub and spoke architecture.

4. The method of claim 3, where a serving gateway (SGW) and a packet data network (PDN) gateway (PGW) of the LTE network are physically located near a hub of the hub and spoke architecture.

5. The method of claim 4, where the hub includes a reconfigurable optical add-drop multiplexer (ROADM).

6. The method of claim 1, where the selected metropolitan OTN optimized for the LTE network includes a ring architecture.

7. The method of claim 6, where a serving gateway (SGW) and a packet data network (PDN) gateway (PGW) of the LTE network are physically located near a distribution site of the ring architecture.

8. The method of claim 7, where the distribution site includes a reconfigurable optical add-drop multiplexer (ROADM).

9. The method of claim 1, where the proposed LTE metropolitan OTNs include at least one hub and spoke architecture and at least one ring architecture.

10. The method of claim 9, where:
the performance test includes a comparison of latencies and jitter associated with the least one hub and spoke architecture and the at least one ring architecture, and
the cost analysis includes a comparison of costs associated with implementation of the least one hub and spoke architecture and the at least one ring architecture.

11. A computing device, comprising:
a memory to store a plurality of instructions; and
a processor to execute instructions in the memory to:
receive Long Term Evolution (LTE) architecture information, Internet protocol (IP) network architecture information, and transport network information,
determine traffic patterns of a LTE network based on the LTE architecture information,
generate proposed LTE metropolitan optical transport networks (OTNs) based on the determined traffic patterns and one or more of the LTE architecture information, the IP network architecture information, and the transport network information,
determine transit switching for the proposed LTE metropolitan OTNs, and
select, from the proposed LTE metropolitan OTNs and based on the transit switching, a metropolitan OTN optimized for the LTE network.

12. The computing device of claim 11, where the processor is further to execute instructions in the memory to:
conduct a performance test on the proposed LTE metropolitan OTNs,
conduct a cost analysis on the proposed LTE metropolitan OTNs, and
select, from the proposed LTE metropolitan OTNs, the metropolitan OTN optimized for the LTE network, based on the performance test and the cost analysis.

13. The computing device of claim 12, where the proposed LTE metropolitan OTNs include at least one hub and spoke architecture and at least one ring architecture.

14. The computing device of claim 13, where:
the performance test includes a comparison of latencies and jitter associated with the least one hub and spoke architecture and the at least one ring architecture, and
the cost analysis includes a comparison of costs associated with implementation of the least one hub and spoke architecture and the at least one ring architecture.

15. The computing device of claim 11, where the processor is further to execute instructions in the memory to:
determine an optimal OTN configuration based on the transport network information and the determined traffic patterns.

16. The computing device of claim 15, where the processor is further to execute instructions in the memory to:
generate the proposed LTE metropolitan OTNs based on the optimal OTN configuration.

17. The computing device of claim 11, where the selected metropolitan OTN optimized for the LTE network includes a hub and spoke architecture.

18. The computing device of claim 17, where a serving gateway (SGW) and a packet data network (PDN) gateway (PGW) of the LTE network are physically located near a hub of the hub and spoke architecture.

19. The computing device of claim 18, where the hub includes a reconfigurable optical add-drop multiplexer (ROADM).

20. The computing device of claim 11, where the selected metropolitan OTN optimized for the LTE network includes a ring architecture.

21. The computing device of claim 20, where a serving gateway (SGW) and a packet data network (PDN) gateway (PGW) of the LTE network are physically located near a distribution site of the ring architecture.

22. The computing device of claim 21, where the distribution site includes a reconfigurable optical add-drop multiplexer (ROADM).

23. The computing device of claim 11, where the selected metropolitan OTN optimized for the LTE network includes one or more access sites and a distribution site interconnected via link aggregation groups (LAGs) that decouple OTN layers.

24. The computing device of claim 23, where one or more virtual local area networks (VLANs) are established between the one or more access sites and the distribution site.

25. One or more non-transitory computer-readable media storing instructions executable by one or more processors of a computing device, the media storing one or more instructions for:
- receiving Long Term Evolution (LTE) architecture information, Internet protocol (IP) network architecture information, and transport network information;
- determining traffic patterns of a LTE network based on the LTE architecture information;
- generating proposed LTE metropolitan optical transport networks (OTNs) based on the determined traffic patterns and one or more of the LTE architecture information, the IP network architecture information, and the transport network information;
- determining transit switching for the proposed LTE metropolitan OTNs;
- conducting a performance test on the proposed LTE metropolitan OTNs;
- conducting a cost analysis on the proposed LTE metropolitan OTNs; and
- selecting, from the proposed LTE metropolitan OTNs, a metropolitan OTN optimized for the LTE network, based on one or more of the transit switching, the performance test, or the cost analysis.

* * * * *